(12) United States Patent
Lee et al.

(10) Patent No.: US 11,968,005 B2
(45) Date of Patent: Apr. 23, 2024

(54) PROVISION OF PRECODER SELECTION POLICY FOR A MULTI-ANTENNA TRANSMITTER

(71) Applicant: Telefonaktiebolaget LM Ericsson (publ), Stockholm (SE)

(72) Inventors: Heunchul Lee, Täby (SE); Maksym Girnyk, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 5 days.

(21) Appl. No.: 17/753,736

(22) PCT Filed: Sep. 12, 2019

(86) PCT No.: PCT/SE2019/050861
§ 371 (c)(1),
(2) Date: Mar. 11, 2022

(87) PCT Pub. No.: WO2021/049984
PCT Pub. Date: Mar. 18, 2021

(65) Prior Publication Data
US 2022/0393729 A1    Dec. 8, 2022

(51) Int. Cl.
*H04B 7/0456* (2017.01)
*G06N 3/08* (2023.01)

(52) U.S. Cl.
CPC ............. *H04B 7/0456* (2013.01); *G06N 3/08* (2013.01)

(58) Field of Classification Search
CPC ...... H04B 7/0456; H04B 7/04; H04B 7/0413; H04B 7/0478; H04B 7/0481;
(Continued)

(56) References Cited

U.S. PATENT DOCUMENTS 8,798,212 B2 *  8/2014  Pan .................. H04B 7/063
                                                    375/243
9,225,400 B2 * 12/2015  Pan .................. H04B 7/0641
(Continued)

FOREIGN PATENT DOCUMENTS

| CA | 2668247 A1 | 5/2008 |
|---|---|---|
| CN | 101584145 A | 11/2009 |
| CN | 109997320 A | 7/2019 |

OTHER PUBLICATIONS

Communication pursuant to Article 94(3) EPC, EP App. No. 19945002.4, dated Aug. 30, 2022, 11 pages.
(Continued)

Primary Examiner — James M Perez
(74) Attorney, Agent, or Firm — WEISBERG I.P. LAW, P.A.

(57) ABSTRACT

Method and device(s) for providing precoder selection policy for a multi-antenna transmitter arranged to transmit data over a communication channel of a wireless communication network. Machine learning in the form of reinforcement learning is applied involving adaptation of an action value function configured to compute an action value based on information indicative of a precoder of the multi-antenna transmitter and of a state relating to at least the communication channel. The adaptation being further based on reward information provided by a reward function, indicative of how successfully data is transmitted over the communication channel, and the precoder selection policy is provided based on the adapted action value function resulting from the reinforcement learning.

20 Claims, 14 Drawing Sheets

(58) Field of Classification Search
CPC .. H04B 7/0482; H04B 7/0487; H04B 7/0617;
H04B 7/063; H04B 7/0695; H04B 7/088;
G06N 3/08; G06N 3/092; G06N 3/02;
G06N 3/09; G06N 3/091; G06N 3/094;
G06N 3/096; G06N 3/098; G06N 3/0985;
H04W 16/24; H04W 16/28
See application file for complete search history.

(56) References Cited

U.S. PATENT DOCUMENTS

| | | | | |
|---|---|---|---|---|
| 10,305,553 | B2* | 5/2019 | O'Shea | H04B 7/0452 |
| 10,581,502 | B2* | 3/2020 | Fresia | H04B 7/0617 |
| 10,637,544 | B1* | 4/2020 | Shattil | H04B 7/0691 |
| 10,673,546 | B2* | 6/2020 | Bedekar | H04W 24/10 |
| 10,938,464 | B1* | 3/2021 | Jeong | H04B 7/063 |
| 11,063,653 | B2* | 7/2021 | Ottersten | G06N 20/20 |
| 11,171,698 | B2* | 11/2021 | Chen | H04B 7/0456 |
| 11,334,807 | B1* | 5/2022 | O'Shea | G06N 20/00 |
| 11,509,363 | B2* | 11/2022 | Timo | H04B 7/0456 |
| 11,509,542 | B2* | 11/2022 | Shirazipour | G06N 3/086 |
| 11,728,851 | B2* | 8/2023 | Timo | H03M 7/6047 |
| | | | | 375/262 |
| 11,742,901 | B2* | 8/2023 | Hong | G06N 3/048 |
| | | | | 375/262 |
| 2008/0112500 | A1* | 5/2008 | Pan | H04B 7/063 |
| | | | | 375/267 |
| 2014/0314169 | A1* | 10/2014 | Pan | H04B 7/063 |
| | | | | 375/267 |
| 2016/0134340 | A1* | 5/2016 | Pan | H04B 7/063 |
| | | | | 370/328 |
| 2016/0261325 | A1* | 9/2016 | Ko | H04B 7/0626 |
| 2017/0117948 | A1* | 4/2017 | Takano | H04B 7/10 |
| 2018/0152852 | A1* | 5/2018 | Chang | H04B 7/0695 |
| 2018/0262918 | A1* | 9/2018 | Zhao | H04B 7/0695 |
| 2018/0322388 | A1* | 11/2018 | O'Shea | H04L 1/0033 |
| 2018/0367192 | A1* | 12/2018 | O'Shea | G06N 3/08 |
| 2019/0356516 | A1* | 11/2019 | Cao | H04L 25/0256 |
| 2020/0112883 | A1* | 4/2020 | Naik | H04L 47/125 |
| 2020/0169311 | A1* | 5/2020 | Ottersten | H04B 7/0695 |
| 2020/0244501 | A1* | 7/2020 | Shattil | H04L 27/2627 |
| 2020/0259545 | A1* | 8/2020 | Bai | H04B 7/0626 |
| 2020/0287639 | A1* | 9/2020 | Su | H04B 17/336 |
| 2020/0343985 | A1* | 10/2020 | O'Shea | G06N 3/08 |
| 2020/0366340 | A1* | 11/2020 | Zhang | H04B 7/0408 |
| 2021/0058936 | A1* | 2/2021 | Gordaychik | H04W 72/23 |
| 2021/0067216 | A1* | 3/2021 | Jeong | H04B 7/0617 |
| 2021/0119881 | A1* | 4/2021 | Shirazipour | H04L 41/0823 |
| 2021/0126684 | A1* | 4/2021 | Chen | H04B 7/0456 |
| 2021/0410135 | A1* | 12/2021 | Yu | H04B 7/0626 |
| 2021/0410161 | A1* | 12/2021 | Wang | G06N 3/08 |
| 2022/0021469 | A1* | 1/2022 | Veijalainen | H04B 17/29 |
| 2022/0046433 | A1* | 2/2022 | Bedekar | H04W 76/10 |
| 2022/0095146 | A1* | 3/2022 | Elshafie | H04L 1/1812 |
| 2022/0131582 | A1* | 4/2022 | Park | H04B 7/0626 |
| 2022/0224461 | A1* | 7/2022 | Lee | H04B 7/0404 |
| 2022/0231912 | A1* | 7/2022 | Jeong | G06N 3/08 |
| 2022/0264331 | A1* | 8/2022 | Arnott | G06N 3/006 |
| 2022/0374685 | A1* | 11/2022 | Lee | G06N 7/01 |
| 2022/0385342 | A1* | 12/2022 | Shen | H04B 7/0617 |
| 2022/0393729 | A1* | 12/2022 | Lee | G06N 3/088 |
| 2023/0012573 | A1* | 1/2023 | Girnyk | H04B 7/0456 |
| 2023/0035971 | A1* | 2/2023 | Girnyk | H04B 7/0456 |
| 2023/0186079 | A1* | 6/2023 | Lee | G06N 3/08 |
| | | | | 706/25 |
| 2023/0309133 | A1* | 9/2023 | Rafael Marques Lima | H04L 5/0037 |
| | | | | 370/278 |
| 2023/0318749 | A1* | 10/2023 | Lins De Medeiros | H04W 24/08 |
| | | | | 370/329 |

OTHER PUBLICATIONS

Ian Goodfellow et al., "Deep Learning," 2016, 798 pages, MIT Press.
International Preliminary Report on Patentability, PCT App. No. PCT/SE2019/050861, dated Mar. 24, 2022, 13 pages.
Supplementary European Search Report, EP App. No. 19945002.4, dated Aug. 17, 2022, 4 pages.
Qisheng Wang et al., "PrecoderNet: Hybrid Beamforming for Millimeter Wave Systems Using Deep Reinforcement Learning", Jul. 31, 2019, pp. 1-7, IEEE Wireless Commun. Letters, vol. 9, No. 10.
International Search Report and Written Opinion for Application No. PCT/SE2019/050861, dated Sep. 11, 2020, 16 pages.
Jongji Huang et al., "Deep-Learning-Based Millimeter-Wave Massive MIMO for Hybrid Precoding," Mar. 2019, pp. 3027-3032, IEEE Transactions on Vehicular Technology, vol. 68, No. 3.
Xiaofeng Li et al., "Deep Learning for Direct Hybrid Precoding in Millimeter Wave Massive MIMO Systems," May 30, 2019, pp. 1-7.
Bo Lincoln, "Pandora 90%: Coverage of Reciprocity-Based Beamforming," Nov. 7, 2017, 50 pages, GFTB-17-001067 Uen, Rev A, Ericsson, downloaded from https://erilink.ericsson.se/eridoc/erl/objectId/09004cff8c6750bd?docno-GFTB-17:001067Uen&action=current&format=ppt12.
Enrique M. Lizarraga et al., "Hybrid beamforming algorithm using reinforcement learning for millimeter wave wireless systems," 2019, pp. 253-258, 2019 XVIII Workshop on Information Processing and Control (RPIC).
David J. Love et al., "Grassmannian Beamforming for Multiple-Input Multiple-Output Wireless Systems," Oct. 2003, pp. 2735-2747, IEEE Transactions on Information Theory, vol. 49, No. 10.
Volodymyr Mnih et al., "Human-level control through deep reinforcement learning," Feb. 26, 2015, 13 pages, vol. 518, Nature, Macmillan Publishers Limited.
Christian B. Peel et al., "A Vector-Perturbation Technique for Near-Capacity Multiantenna Multiuser Communication Part I: Channel Inversion and Regularization," Jan. 2005, IEEE Transactions on Communications, vol. 53, No. 1.
Mirette Sadek et al., "A Leakage-Based Precoding Scheme for Downlink Multi-User MIMO Channels," May 2007, pp. 1711-1721, IEEE Transactions on Wireless Communications, vol. 6, No. 5.
Zhaoyuan Shi et al., "Deep Reinforcement Learning-Based Intelligent User Selection in Massive MIMO Underlay Cognitive Radios," Jul. 30, 2019, 11 pages, IEEE Access.
Richard S. Sutton et al., "Reinforcement Learning: An Introduction," Nov. 5, 2017, 445 pages, The MIT Press.
Chinese office Action with Search Report dated Feb. 1, 2024 for Application No. 2019801002575 with English language machine translation, consisting of 18 pages.

* cited by examiner

Algorithm 1 Learning algorithm through two-way interactions with MIMO system
1: Initialize action-value function $Q_\theta$ with random parameters $\theta$
2: for episode ep=1,E do
3:    Agent starts a new episode by observing the initial state $s_0$ from MIMO system
4:    for time step t=0,T-1 do
5:       Agent chooses an action $a_t$, to serve MIMO system, according to
6:       $a_t = \begin{cases} \text{with probability } \epsilon, \text{ select a random action from a predefined precoder set} \\ \text{otherwise, take a greedy action by} \arg\max_{a \in A} Q_\theta(s_t, a) \end{cases}$
7:       MIMO system executes action $a_t$
8:       Agent observes $ber_t$ and the next state $s_{t+1}$
9:       Agent computes the reward $r_t = \log_2(1 - ber_t) + 0.5$
10:      Agent computes the loss function $L(\theta)$ w.r.t new estimate $Y_t^\theta$ and current value $Q_\theta(s_t, a_t)$
11:      Agent performs a gradient descent update w.r.t $\theta$
12:    end for
13: end for

FIG. 9A

Algorithm 2 Learning algorithm through one-way interactions with MIMO system
1: Initialize action-value function $Q_\theta$ with random parameters $\theta$
2: for episode ep=1,E do
3:    Agent starts a new episode by observing the initial state $s_0$ from MIMO system
4:    for time step t=0,T-1 do
5:       MIMO system chooses an action $a_t$ and executes it
6:       Agent observes $ber_t$ and the next state $s_{t+1}$
7:       Agent computes the reward $r_t = \log_2(1 - ber_t) + 0.5$
8:       Agent computes the loss function $L(\theta)$ w.r.t new estimate $Y_t^\theta$ and current value $Q_\theta(s_t, a_t)$
9:       Agent performs a gradient descent update w.r.t $\theta$
10:   end for
11: end for

FIG. 9B

PROVISION OF PRECODER SELECTION POLICY FOR A MULTI-ANTENNA TRANSMITTER

CROSS-REFERENCE TO RELATED APPLICATIONS

This application is a National stage of International Application No. PCT/SE2019/050861, filed Sep. 12, 2019, which is hereby incorporated by reference.

TECHNICAL FIELD

Embodiments herein concern methods and arrangements relating to provision of a precoder selection policy for a multi-antenna transmitter arranged to transmit data over a communication channel of a wireless communication network, e.g. a telecommunication network.

BACKGROUND

Communication devices such as wireless communication devices, that simply may be named wireless devices, may also be known as e.g. User Equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", gNB, or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in, or by, a cell, this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) may be used for the transmission path from the base station to the wireless device. The expression uplink (UL) may be used for the transmission path in the opposite direction i.e. from the wireless device to the base station.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G).

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO. A MIMO channel may refer to wireless radio links with multiple antennas at the transmitter and receiver. Also, from a system perspective, a system with multiple transmit antennas and multiple receive antennas may be referred to as a MIMO system. There are also Multiple-Input Single-Output (MISO) channels and system relating to multiple transmit antennas and single receive antenna, and Single-Input Multiple-Output (SIMO), relating to single transmit antenna and multiple receive antennas. Sometimes MIMO, although technically incorrect, used to refer to any channel or system involving multiple antennas for a transmission. In any case, in the context of the present disclosure, focus is mainly on multiple antennas used for transmission, and hence MIMO and MISO cases.

The first version of the NR, i.e. a 5G, standard has been specified. A core component in NR is the support of MIMO antenna deployments and MIMO related techniques. It is expected that NR will support downlink MIMO with channel dependent precoding. The spatial multiplexing mode is aimed for high data rates in favorable channel conditions. An illustration of the spatial multiplexing operation is provided in FIG. 1, where Cyclic Prefix (CP) Orthogonal Frequency Division Multiplexing (OFDM) is used in the downlink.

As indicated in the figure, an information carrying symbol vector d with k layers is multiplied by an $N_{nt} \times k$ precoder matrix W, which serves to distribute the transmit energy in a subspace of a $N_{nt}$ dimensional vector space, where $N_{nt}$ corresponds to a number of antenna ports. The k symbols in d each corresponds to a layer and k is typically referred to as the transmission rank. In this way, spatial multiplexing is achieved since multiple symbols can be transmitted simultaneously over the same Time and/or Frequency Resource Element (TFRE). The number of symbols k is typically adapted to suit the current channel properties.

The precoding problem is challenging, and particularly under multi-cell multi-user environments. FIG. 2 schematically illustrates an example of such environment, where multiple base stations, i.e. BSs, want to transmit data streams to multiple wireless devices, here user equipments, i.e. UEs, using the same time and frequency resources. As illustrated by the dotted lines, corresponding to unwanted signals, an UE served by a BS may be affected by interference from transmission to other UE(s), the transmissions originating from the same BS and/or from other BS(s). It is realized that this becomes even more challenging in practice with even larger number of transmitters, receivers, users and under real world dynamic circumstances.

Since the radio resources are limited and expensive, it is desirable to use MIMO techniques in order to increase the received power at antennas of the UEs and reduce the intra-cell and inter-cell interferences, so that this results in more efficient utilization of the time and frequency resources. To be able to accomplish this, selecting a suitable precoder, as mentioned above, is needed or even crucial. This may be referred to as the precoding optimization problem or simply precoder problem.

There exists a number of different solutions to the precoder problem. It has however turned out that most analytical solutions become too complicated for practical implementation, at least under present frequency-selective wideband systems. Instead, for frequency-selective channels, the precoding optimization problem is solved by approximate methods. One standard approximation method is to replace a set of associated channel matrices by an approximate version of their covariance matrices.

SUMMARY

In view of the above, an objective is to provide one or more improvements in relation to the prior art, in particular to provide improvements regarding precoder selection for a multi-antenna transmitter for transmitting data over a communication channel of a wireless communication network.

According to a first aspect of embodiments herein, the objective is achieved by a first method, performed by one or more first devices, for providing a precoder selection policy for a multi-antenna transmitter arranged to transmit data over a communication channel of a wireless communication network. Machine learning in the form of reinforcement learning is applied and involves adaptation of an action value function configured to compute an action value based on action information and state information. The action information being information indicative of a precoder of the multi-antenna transmitter. The state information being information indicative of a state relating to at least the communication channel. Said adaptation of the action value function being further based on reward information provided by a reward function, where reward information is information indicative of how successfully data is transmitted over the communication channel. Further, said precoder selection policy is provided based on said adapted action value function resulting from the reinforcement learning.

According to a second aspect of embodiments herein, the objective is achieved by computer program comprising instructions that when executed by a processing circuit causes said one or more first devices to perform the first method according to the first aspect.

According to a third aspect of embodiments herein, the objective is achieved by a carrier comprising the computer program according to the second aspect.

According to a fourth aspect of embodiments herein, the objective is achieved by a second method, performed by one or more second devices, for selecting a precoder of a multi-antenna transmitter. The multi-antenna transmitter being configured to transmit data over a communication channel of a wireless communication network. A precoder selection policy, provided according to the first aspect, is obtained. Further, state information regarding a present state is obtained. The precoder is then selected based on the obtained precoder selection policy and the obtained present state information.

According to a fifth aspect of embodiments herein, the objective is achieved by a computer program comprising instructions that when executed by a processing circuit causes said one or more second devices to perform the second method according to the fourth aspect.

According to a sixth aspect of embodiments herein, the objective is achieved by a carrier comprising the computer program according to the fifth aspect.

According to a seventh aspect of embodiments herein, the objective is achieved by one or more first devices for providing a precoder selection policy for a multi-antenna transmitter arranged to transmit data over a communication channel of a wireless communication network. Said first device(s) is configured to apply machine learning in the form of reinforcement learning involving adaptation of an action value function configured to compute an action value based on action information and state information. The action information being information indicative of a precoder of the multi-antenna transmitter. The state information being information indicative of a state relating to at least the communication channel. Said adaptation of the action value function being further based on reward information provided by a reward function, where reward information is information indicative of how successfully data is transmitted over the communication channel. Further, said first device(s) is configured to provide the precoder selection policy based on said adapted action value function resulting from the reinforcement learning.

According to an eight aspect of embodiments herein, the objective is achieved by one or more second devices for selecting precoder of a multi-antenna transmitter. The multi-antenna transmitter being configured to transmit data over a communication channel of a wireless communication network. The second device(s) is configured to obtain a precoder selection policy according to the first aspect, and to obtain state information regarding a present state. The precoder is further configured to select the precoder based on the obtained precoder selection policy and the obtained present state information.

Embodiments herein enable to, through reinforcement learning, learn an optimized precoder selection policy based on the feedback of reward information without any detailed knowledge on an underling system and channel model in the wireless communication network. For instance, simulation results supports that embodiments have the capacity to reach a near-optimal policy for a Single User (SU) precoder with a relatively simple agent that e.g. may be implemented by a shallow neural network. Second, implementing embodiments herein requires very little engineering by hand and embodiments herein can also easily take advantage of future improved and novel reinforcement learning algorithms and architectures, e.g. as currently are being developed for deep neural networks and related learning methods. Embodiments herein may be suitable for very challenging MIMO problems.

BRIEF DESCRIPTION OF THE DRAWINGS

Examples of embodiments herein are described in more detail with reference to the appended schematic drawings, which are briefly described in the following.

FIG. 9A-B are pseudo code regarding implementation of some embodiments herein relating to "two-way" and "one-way" approaches.

DETAILED DESCRIPTION

Figure 1:
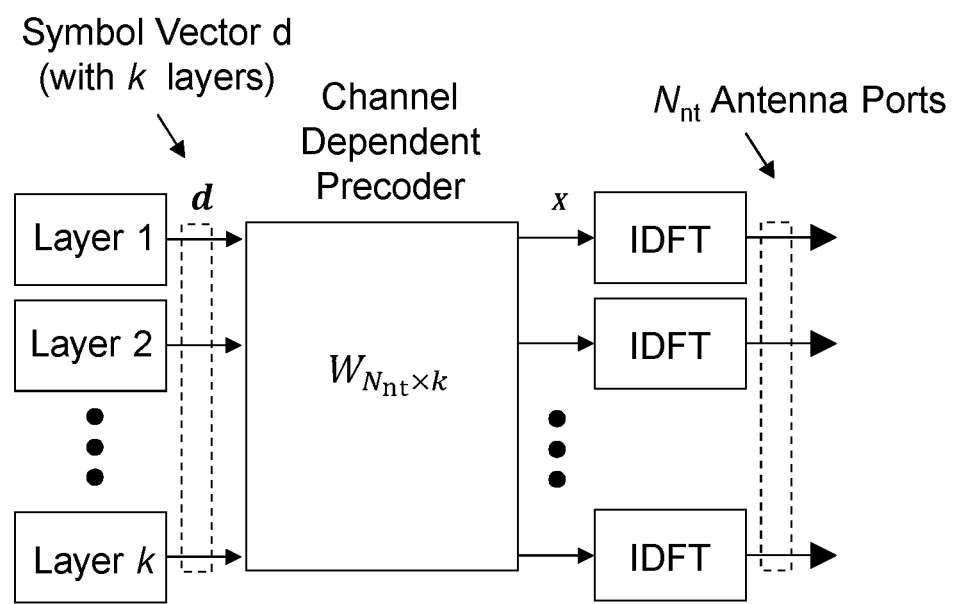
FIG. 1 schematically illustrated a spatial multiplexing operation for MIMO systems for NR networks.
Figure 2:
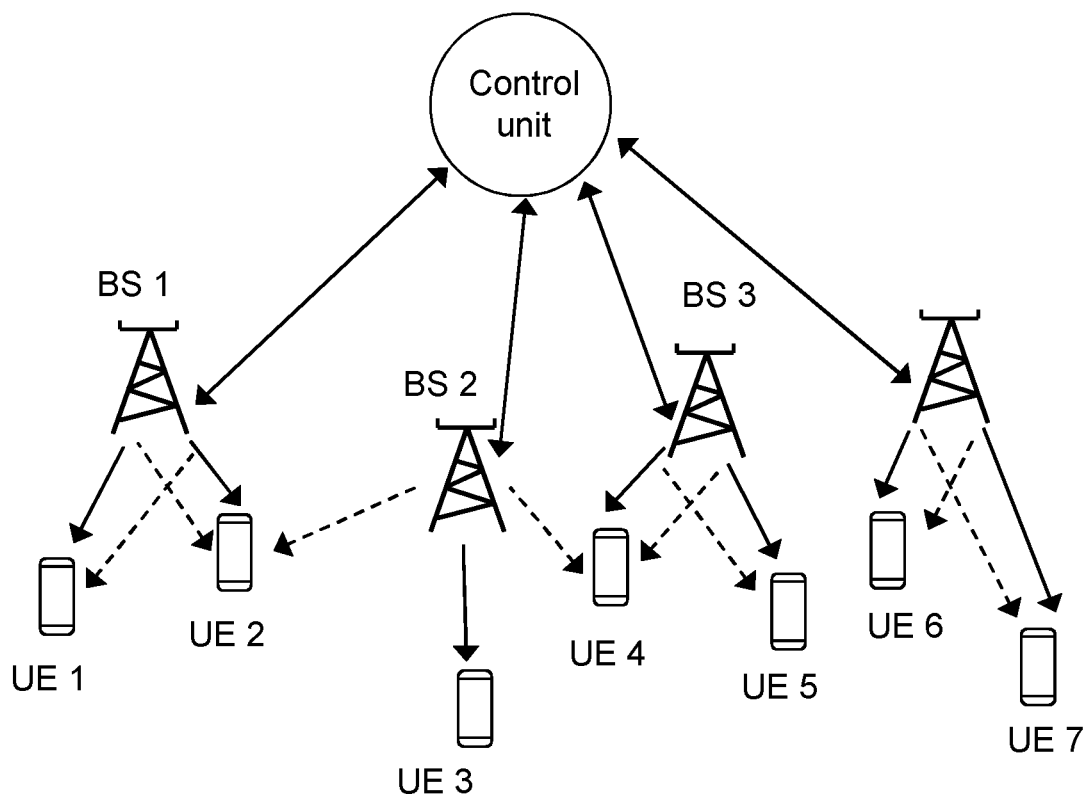
FIG. 2 schematically illustrates an example of a multi-cell multi-user environment.

Throughout the following description similar reference numerals may be used to denote similar elements, units, modules, circuits, nodes, parts, items or features, when applicable.

Embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

The use of prior art approximate methods as mentioned in the Background often means that the accuracy of the precoder may become unacceptable even in acceptable channel conditions with good channel estimation accuracy. There is thus a need for some alternative to the prior art analytical and approximate methods and which alternative enable improved solutions to the precoder problem, i.e. regarding selection of precoder, and that are practically applicable.

The solution according to embodiments herein may briefly be described as relating to a learning approach for finding a suitable precoder of a multi-antenna transmitter, such as of a MIMO system, where a learning agent may select and/or observe precoders for the multi-antenna transmitter based on contextual information about relevant environment conditions, corresponding to information on state of the system, while simultaneously adapting a precoder selection policy based on reward feedback from the environment and seeking to maximize a reward, e.g. a reward value, provided by a predefined reward function. The proposed learning-based approach, which will be described in detail in the following, is able to learn an optimized or even optimal policy for precoder selection, even in very challenging dynamic MIMO/MISO environments. The precoder may be selected from a pre-defined codebook so that the selected precoder maximizes the reward for a given state information.

Embodiments herein enable to learn an optimized precoder selection policy based on the feedback of rewards without any detailed knowledge on the underling system and channel model in the wireless communication environments. For instance, simulation results support that embodiments have the capacity to reach a near-optimal policy for a Single User (SU) precoder with a relatively simple agent that e.g. may be implemented by a shallow neural network. Second, implementing embodiments herein requires very little engineering by hand and the approach can easily take advantages of coming improved and novel learning algorithms and architectures, e.g. as currently are being developed for deep neural networks and related learning methods. Embodiments herein may be suitable for very challenging MIMO problems.

Reinforcement Learning (RL) is an area of Machine Learning (ML) and RL techniques have recently developed significantly and have received great attention not only from ML research community but also from various industries. RL e.g. has high potential as a major enabler for a disruptive evolution of current and future wireless networks.

RL may be described as a set of methods that allows an agent to learn an optimal action policy that returns a maximum reward through trial-and-error interactions with a dynamic environment. Reinforcement learning differs from the more known supervised ML using training data, where a model is trained with the correct answer itself, whereas in reinforcement learning, there is no answer but instead learning is by experience involving various degrees of trial and error, typically by using a so called RL agent. For a person skilled in ML, training by RL can easily be identified as a certain type of ML. As used herein, RL may more specifically be regarded as ML based on adapting an action value function, e.g. relating to an action policy, to improve or optimize it so it can be used to provide improved or optimized actions from an action space. The adaptation being based on action information, state information and reward information, where the action information is information indicative of an action in the action space, the state information is information indicative of a state relating to an environment affected by actions from the action space, and the reward information, e.g. provided by a reward function, is information indicative of a reward resulting from a certain action applied during the learning, i.e. training. When the value function has been adapted, i.e. trained, it can be used to provide improved, i.e. better, optimized or even optimal, actions, from the action space, based on state information, without having to use the reward function.

Deep Learning (DL) methods are representation-learning methods with multiple levels of representation, obtained by composing simple but non-linear modules that each transform the representation at one level into a representation at a slightly higher and more abstract level. With the composition of enough such transformations, very complex functions can be learned. Therefore, by combining the benefits of two techniques, RL and DL, the result is so called Deep RL (DRL). DRL can be used to extract contextual features, corresponding to states, of environment conditions and to learn a mapping between the extracted features and the best action for very complex optimization problems, such as in challenging wireless communication environments, at different network layers including physical, data link, network and transport layers. Some embodiments herein, described further below, are DRL-based.

Figure 3:
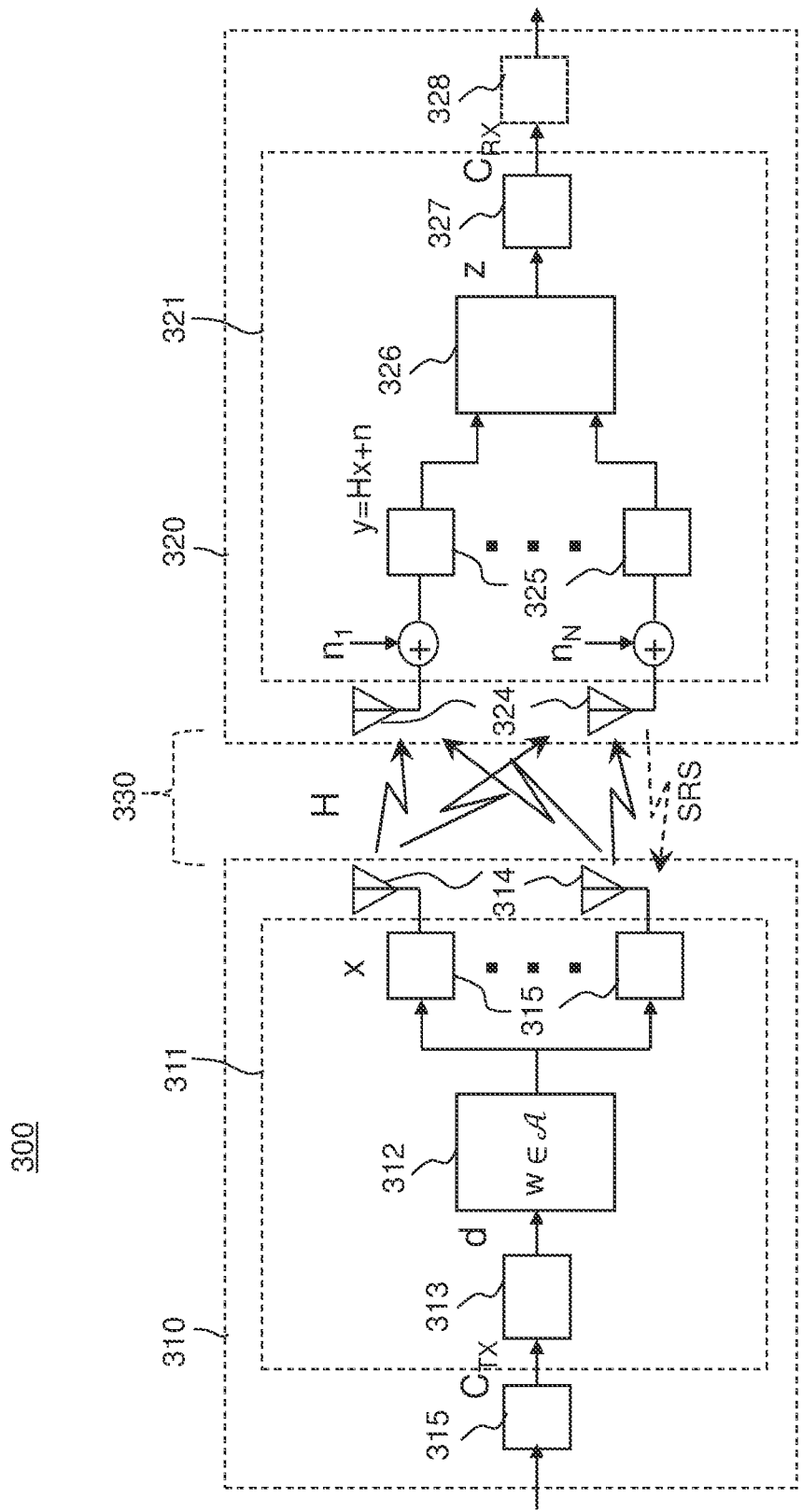
FIG. 3 schematically shows a block diagram with functional blocks of a known MIMO system.

FIG. 3 schematically shows a block diagram with functional blocks of a known, typically codebook-based, MIMO system 300 equipped with $N_{TX}$ transmit antennas 314 and $N_{TX}$ receive antennas 324, where a precoder of a precoder block 312 corresponds to a complex-valued precoding vector $w \in \mathbb{C}^{N_{TX} \times k}$ and is comprised in a multi-antenna transmitter 311. As should be understood, k here denotes the transmission rank as discussed in the Background and thus corresponds to the number of layers of transmission of a symbol vector d subject to the precoding. The precoding vector w may be selected from a pre-defined codebook $\mathcal{A}$. The precoding vector at the transmitter and an associated combining vector at the receiver, comprised in a multi-antenna receiver 321, are applied for exploiting the spatial diversity available in MIMO systems.

The shown system will not be discussed in any great detail herein since it is based on a known model where parts as well as their function are known to the skilled person. It is mainly used here as reference and for explaining further below how embodiments herein can be used with and relate to such system. Details shown may thus be considered a selection of details that may facilitate understanding of embodiments herein. The selection as such is not considered part of the prior art.

The transmitter 311 may be comprised in a transmitting device 310, e.g. a base station, such as a gNB, and the receiver may be comprised in a receiving device 320, e.g. a wireless communication device, such as a UE. The shown block diagram may be considered based on a known complex-valued baseband signal model of a MIMO system. Bit-Interleaved Coded Modulation (BICM) has been exploited for a wide range of wireless communication systems including the IEEE Local-Area Network (LAN) and 3GPP LTE systems. The time is slotted with a certain duration, such as 1 ms, which corresponds to one Transmission Time Interval (TTI) in LTE systems. At each time step, one transport data bit block $B_{TX}$ may generated at the transmitter side and encoded, in the figure by an encoder 315, to a code block $C_{TX}$ using a convolution channel code and Cyclic Redundancy Check (CRC) codes. CRC codes are widely employed in data communication as a final integrity check on a packet, performing error detection. Generally the encoder 315 provides channel coding to the data to be transmitted and provides encoded data for transmission, corresponding to the transmit code block $C_{TX}$, as illustrated in the figure, and that thus may be input to the multi-antenna transmitter 311, e.g. to a modulator 313 thereof. The modulator 313 in turn provides its output signal, here the symbol vector d as input to the precoder block 312 for precoding, such as by a precoding vector w selected from the pre-defined codebook $\mathcal{A}$. The output of the precoder block 312 correspond to signal x in the figure and is input to Inverse Discrete Fourier Transforms (IDFTs) 315 that in turn provide signals for transmission by said transmit antennas 314.

The transmit antennas 314 are arranged transmit over a communication channel 330 that here corresponds to a MIMO channel and that may be described by a channel matrix H.

To reliably transmit the signal d over the communication channel 330, it is desirable to find a, preferably optimal, precoder selection algorithm for choosing the best possible, or even optimal, precoder, e.g. from the pre-defined codebook tel. In other words, it is desirable to use a precoder that optimizes performance, as discussed above.

The receiver 321 may operate in a conventional manner and thus in basically a reverse order compared to the transmitter 311. Hence, the receive antennas 324 of the receiver 321 receive the signals transmitted over the communication channel 330 by the transmit antennas 314. DFTs 325 operate on outputs, respectively, of the receive antennas 324 and thus on the received signals. The DFT outputs are input to a combiner 326, that in turn, as output, provide a signal z that a demodulator 327 may operate on and provide received encoded data $C_{RX}$ for further decoding etc., e.g. by a decoder 328.

As can be seen, in FIG. 3 the presence of Sounding Reference Signals (SRSs) in a reverse-link channel is also indicated, i.e. here in direction from receiver to transmitter. These SRSs may correspond to conventional such signals. In general, in communication systems supporting MIMO communication technology there is access to information on, typically estimates of, the channel responses between the transmitter and receiver, such as between base station, e.g. gNB, and wireless device, e.g. UE, served in an associated cell. An example of such information is Channel State Information (CSI). For at least TDD-based system, it is possible to apply the physical channel property of reciprocity and use the uplink sounding and channel estimation to obtain the downlink channel estimates. For instance, in 3GPP LTE and NR systems, pilot symbol called SRS are available and can be sent by the UEs in the uplink and received by the BSs to obtain the downlink CSI, e.g. of a MIMO channel, thanks to channel reciprocity. Hence, under assumption that channel responses in the uplink and downlink directions are the same, estimated channels at resource elements associated with SRS in the uplink direction can e.g. be used for precoding in the downlink direction.

In wideband LTE and NR systems, multicarrier systems can be applied to combat frequency selective channels. Orthogonal frequency division multiplexing (OFDM) has been proposed for the multi-carrier approach. In the case of frequency-selective fading channels, multiple SRSs should be transmitted across the subcarriers and OFDM symbols.

In the shown system and as indicated above, the modulator 313 may convert the transmit code blocks $C_{TX}$ to the symbol vector d by means of e.g. QAM constellation. The symbol vector d is then multiplied with the precoding matrix w to form a $N_{TX}$-dimensional complex transmitted signal vector x=wd. Then, the complex-valued received signal vector
$y \in \mathbb{C}^{N_{TX} \times 1}$ may be given by $$y = Hx + n \qquad \text{Equation 1}$$

where $n \in \mathbb{C}^{N_{TX} \times 1}$ is an Additive White Gaussian Noise (AWGN) vector whose elements are i.i.d. complex-valued Gaussians with zero mean and variance $\sigma_n^2$. In the shown receiver 323, it is illustrated how noise n is added at each receive antenna 324. Without loss of generality, it can be assumed that the data symbols in d and the precoding vector w are normalized so that $\|x\|^2 = \|wd\|^2 = 1$, where $\|\cdot\|$ denotes the 2-norm of a vector. Under these assumptions, the SNR is given by $1/\sigma_n^2$.

At the receiver, the receive code block $C_{RX}$ will be recovered through the demodulator 327.

Figure 4:
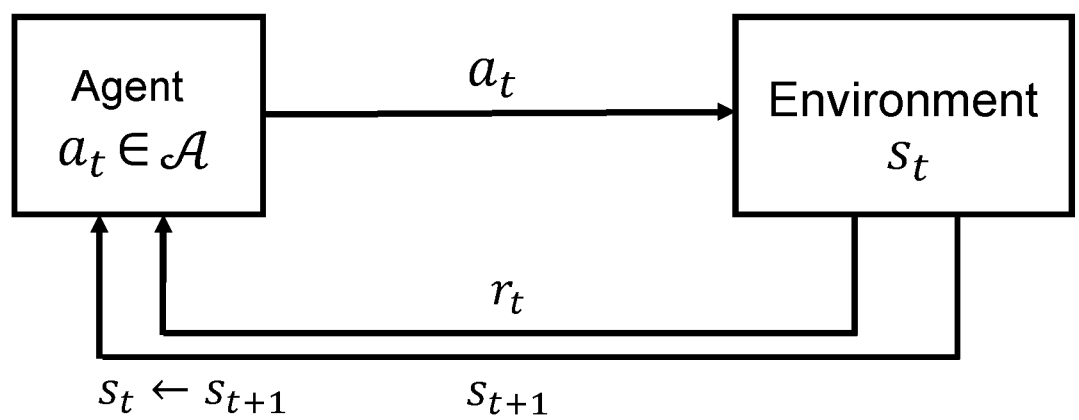
FIG. 4 is a block diagram schematically showing the principle of a reinforcement learning procedure.

FIG. 4 is a block diagram schematically showing the principle of a reinforcement learning procedure to the precoding problem for a multi-transmitter, e.g. of a MIMO system such as in FIG. 3. Embodiments herein can be considered based upon the shown principle, which is that an agent learns an optimized or optimal action selection policy through sequences of state $s_t$, action $a_t$ and reward $r_t$. As should be understood, in practice, the state, action and reward correspond to suitable type of information. The agent may observe a context vector, corresponding to state s, of environment conditions and may then choose a precoder, corresponding to action a, from a pre-defined codebook $\mathcal{A}$, to serve said environment. Note that the agent here can achieve its learning goal through interactions with a black-box environment, i.e. without having to utilize any detailed knowledge about the environment and its parts. After each time step t, the agent receives feedback, corresponding to a reward $r_t$, in return for an action $a_t$ taken. Over the time t=0, 1, . . . , the agent may thereby learn about how context vectors, i.e. states $s_t$, and actions $a_t$ corresponding to precoders relate to each other so that the agent thereafter can predict the best precoder, corresponding to taking an action a, by observing only the state s, e.g. context vectors, corresponding to information extracted from the environment. In principle any environmental information that can help the agent learn the optimal policy. For embodiments herein, the state s, or rather state information corresponding to said context vector, may be extracted from e.g. Channel State Information (CSI). The communication channel, e.g. corresponding to communication channel 330 or similar, may be represented by a channel matrix $H \in \mathbb{C}^{N_{RX} \times N_{TX}}$ that is high-dimensional and continuous. The state s may be represented in the form of a vector with size $2N_{RX}N_{TX}$ of the entries in H, as follows:

$$s = \text{vec}(H) = \{Re[h_{j,i}], Im[h_{j,i}]\}_{i \in [1, \ldots, N_{TX}], j \in [1, \ldots, N_{RX}]} \qquad \text{Equation 2}$$

where $h_{j,i}$ represents the channel coefficient from a transmit antenna i to a receive antenna j, and $Re[\cdot]$ and $Im[\cdot]$ represent the real and imaginary parts of complex value.

Figure 5:
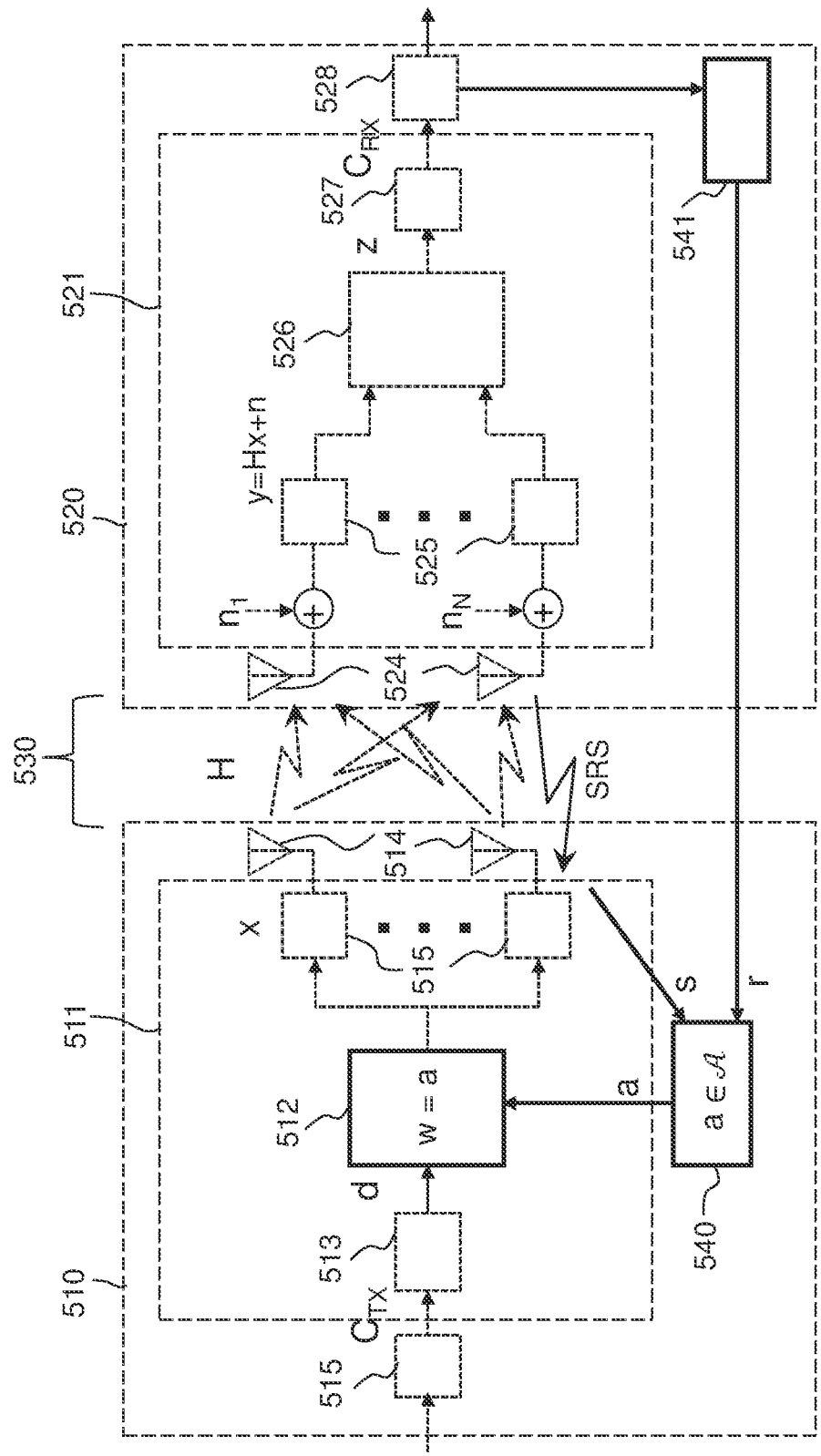
FIG. 5 schematically shows a block diagram with functional blocks of a MIMO system for illustrating some embodiments herein.

FIG. 5 schematically shows a block diagram with functional blocks of a MIMO system 500. The main purpose with this figure is to illustrate how some embodiments herein may operate in relation to a prior art MIMO system as in FIG. 3. To avoid repeating, in the following focus will be on differences compared to the MIMO system 300 in FIG. 3. Features corresponding to those in FIG. 3 have been drawn with dotted lines in FIG. 5 to facilitate comparison and focus on the differences. Hence, in FIG. 5, there are transmit antennas 514 that may correspond to the transmit antennas 314, receive antennas 524 that may correspond to the receive antennas 324, a transmitting device 510 that in many details correspond to the transmitting device 310 and that comprises a multi-antenna transmitter 511 similar to the multi-antenna transmitter 311, a receiving device 520 that in many details correspond to the receiving device 320 and that comprises a multi-antenna receiver 521 similar to the multi-antenna receiver 321, an encoder 515 that may correspond to the encoder 315, a modulator 513 that may correspond to the modulator 313, IDFTs 515 that may correspond to the IDFTs 315, a communication channel 530 that may correspond to the communication channel 330, DFTs 525 that may correspond to the DFTs 325, a combiner 526 that may correspond to the combiner 326, a demodulator 527 that may correspond to the demodulator 327 and a decoder 528 that may correspond to the decoder 328.

There is also a communication channel 530 that may be similar or even the same as the communication channel 330 and that may be described by a channel matrix H.

A difference compared to FIG. 3 is a RL agent 540 that may correspond to the agent in FIG. 4 and that here is arranged to, based on RL, optimize selection of precoder for a precoder block 512, i.e. the RL agent 540 is arranged to, based on reinforcement learning, learn how to select an optimal precoder. The main function of the precoder block 512 corresponds to the function of the precoder block 312, i.e., to select precoder to be used, but instead of just applying a conventional precoder selection policy, such as based on analytical or approximate solutions to the precoder problem, the precoder selection is here based on RL, and at least during training, the precoder block 512 may be controlled by the RL agent 540.

The RL agent 540 thus aims to learn how to select a precoder $w \in \mathbb{C}^{N_{TX} \times k}$ from the pre-defined codebook $\mathcal{A}$ in order to maximize a reward r provided by a reward function of a reward function block 541 in the figure. As indicated in the figure and further described below, the reward rand reward function may be based on Bit-Error Rate (BER) at the receiver after transmission over the communication channel. CRC codes at decoding of receive code blocks $C_{RX}$ may be checked and be used to calculate BER as a part of the reward function, e.g. implemented in reward function block 541 in the figure. The reward function may be implemented in the receiving device 520 as illustrated, even in the receiver 521, but may in principle be implemented by any device or node with computing capabilities, configured to obtain information from the receiving device 520 regarding BER and communicatively connected to the RL agent 540 for provision of information regarding the reward r computed according to the reward function.

BER performance may be computed by comparing the transmit code block $C_{TX}$ and the receive code block $C_{RX}$, which can be considered as representing an action value of precoder w over the channel state H. Experimental BER may be expressed as $$BER_{exp}(H,w)=BER(C_{TX},C_{RX}|H,w) \quad \text{Equation 3}$$

Figure 6:
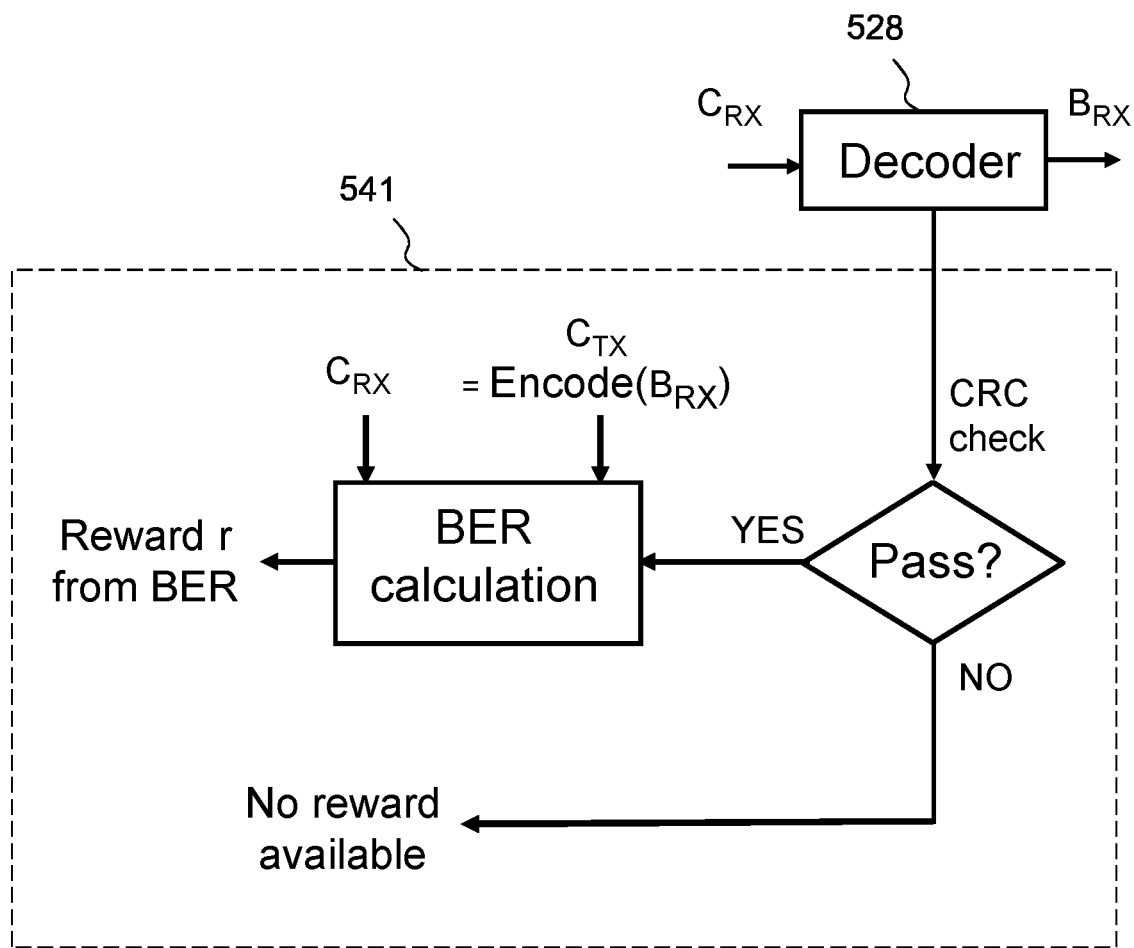
FIG. 6 is a block diagram schematically illustrating an example of reward generation relating to some embodiments herein.

In the BER computation according to Equation 3, one problem may be the availability of the transmit code block $C_{TX}$ at the receiver side. However, the receiver 520 may recover the transmit code block $C_{TX}$ by re-encoding a received data block $B_{RX}$ but only when the CRC check is passed. FIG. 6 is a block diagram schematically illustrating this principle and how it can be utilized by the reward function block 541, i.e. for reward generation with help of CRC check and an encoder. What is shown should be rather self-explanatory, the principle being that if there is a CRC check pass, BER is calculated based on $C_{RX}$ and a re-encoding of a received data block $B_{RX}$ representing $C_{TX}$. The reward r may then be computed based on the BER, as explained in the following.

A reward function should depend on H and w, i.e. the channel and the selected precoder, i.e. may be expressed as $f$ (H, w) and may be derived from the experimental $BER_{exp}$ (H,w) in Equation 3. The BER region may be upper bounded by a predetermined maximum BER value, e.g. 0.5 (50%).

$$BER_{exp}(H,w) \leftarrow \min(BER_{exp}(H,w),0.5) \quad \text{Equation 4}$$

The Bit-Success Rate (BSR) may then be defined as $$BSR_{exp}(H,w) \leftarrow 1-BER_{exp}(H,w) \quad \text{Equation 5}$$

Finally, the reward function $f(H, w) \in [-0.5, +0.5]$ may be defined by using the following pre-process to said BSR $$f(H,w) \leftarrow \log_2(BSR_{exp}(H,w))+0.5 \quad \text{Equation 6}$$

As explained, in the proposed RL approach, the learning problem is solved by estimating the optimal value of each action when taking that action and following the optimal policy.

Let Q*(s, a) denote the optimal value of a state-action pair (s, a). From this definition, a simple optimal strategy is obtained by taking the action a* with the highest action value in given state s as follow $$a^* = \arg\max_{a \in \mathcal{A}} Q^*(s, a) \quad \text{Equation 7}$$

The goal of the RL agent 540 may thus be to learn the value function Q*(s, a) through interactions with the environment of the MIMO system 500, via s and r, i.e. based on state and reward information. Once the learning is completed, the learned value function can be utilized to choose an optimized precoder based on Equation 7 by observing only the state s.

In other words, after training, i.e. when there exists a trained and/or optimized precoder selection policy resulting from the training, the arrangement may change from what is shown in FIG. 5. The reward feedback then need not be used and the precoder selection can be based on only state information e.g. based on SRS and/or CSI, as input. The trained precoder selection policy may thus e.g. be implemented directly in or by the transmitter, such as in the precoder block 512 with the state information as input. Of course it is also possible to keep the RL agent used during the training and just change its operational mode, to instead of training and improving the precoder selection policy, only apply the learned precoder selection policy based on the state information s, i.e. without having to consider any reward r.

Figure 7:
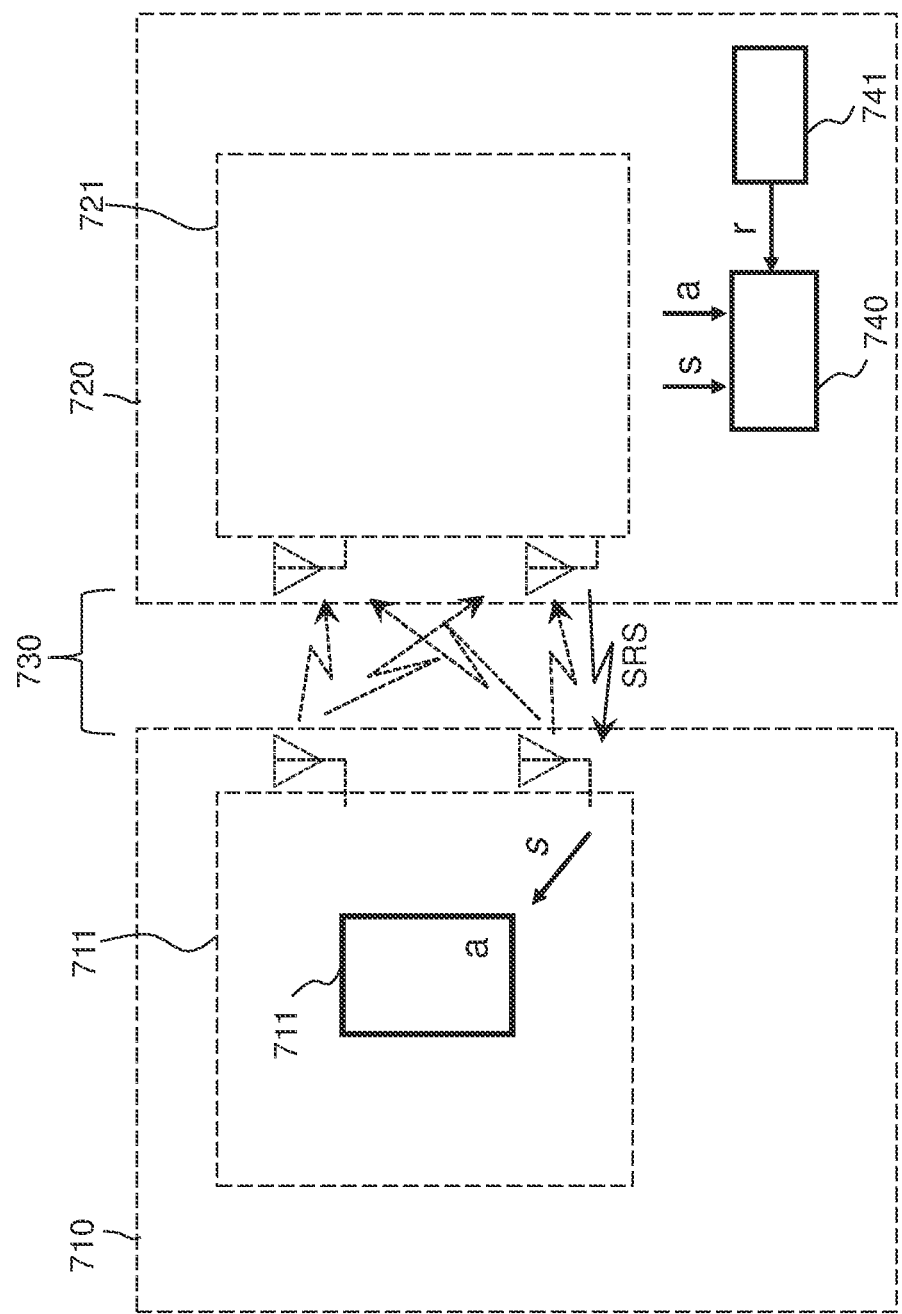
FIG. 7 schematically shows a block diagram with functional blocks of another MIMO system for illustrating some further embodiments herein.

FIG. 7 schematically shows a block diagram with functional blocks of another MIMO system 700 and will be used for discussing some further embodiments herein. In order not to obscure with too many details, focus will be on differences compared to the MIMO system 500 and the situation discussed above in relation to FIG. 5. FIG. 7 is therefore also drawn with less details. Except for the differences indicated in the following, details and functionality may be as for the MIMO system 500. Hence, as should be realized, there is a transmitting device 710 similar to the transmitting device 510 and comprising a multi-antenna transmitter 711, a receiving device 720 similar to the receiving device 520 and comprising a multi-antenna receiver 721.

There is also a communication channel 730 that may be similar or the same as the communication channel 530.

Further, there is a reward function block 741 that may be similar or the same as the reward function block 541.

The main difference is in that there is a RL agent 740 arranged for "one-way" training, i.e. "one-way" RL, while the RL agent 540 in FIG. 5 is based on "two-way" training, i.e. "two-way" RL. That is, in FIG. 5 the RL agent 540 is arranged so that it can participate in selecting precoder during the training, and the RL agent 540 may control exploration and exploitation of actions, i.e. selected precoders, during the training. This is associated with some advantages, however, from some perspectives and in some situations, it may be disadvantageous, e.g. if the system being trained is operative in the real world and is serving real users, which means that the users will be exposed to non-optimal and potentially poor precoder selections at least until the training has resulted in an optimal or at least sufficiently trained precoder selection policy. Also, as realized from FIG. 5, there is during training feedback of reward information from the receiving device 520 to the transmitting device 510 to take care of. In case action selection during training means interruptions or disturbances to an involved MIMO system, this can be costly since radio frequency spectrum is a limited and an expensive resource in real world wireless networks. An operator of a wireless communication network may also have to guarantee a certain quality of service and/or do not want to risk customer relations. Further, an RL agent selecting precoders during training can significantly affect the system's performance by e.g. causing harmful interference to the MIMO system.

The "one way training" as indicated in FIG. 7 offers a solution to this. The basic idea is that that the RL agent 740 in addition to monitoring state s, also monitors and observes the precoder selected according to some existing precoder selection policy, i.e. monitors and observes each action a taken and associated with an observed state s. Similar as before, the RL agent 740 obtains information on reward r associated with state and action pairs (s, a). The precoder index identifying the selected precoder, and that thus corresponds to an action a, is typically sent from the transmitter to receiver, i.e. in the forward-link and is available in the receiving device. Also, pilot signals, such as DeModulation rRference Signals (DMRS) and similar, are also available in the forward-link and can be used similarly as the reverse-link SRS described above to provide information on state s.

Since existing precoder selection policies are non-optimal, they will contain a mix of exploration and exploitation, and may thus serve for training. For instance, a MIMO precoding design may be applied on a Precoding Resource block Group (PRG) basis in MIMO OFDM systems over frequency selective fading, which is representative of MIMO precoding applications in real-world deployments. 3GPP has e.g. specified that each PRG may be formed by consecutive Physical Resource Blocks (PRBs) and the precoder being the same across all PRBs within a PRG. Since the frequency selectivity makes it a challenge to obtain a MIMO precoding matrix that is optimal for all the PRBs within the PRG, conventional networks and systems use approximate algorithms based on a channel covariance matrix averaged over the pilot signals in a PRG to find a suboptimal solution.

The RL agent 740 may advantageously be implemented in the receiving device 720, although it may alternatively be implemented in some other device as long as it can obtain, e.g. receive, the information on action a, state s and associated reward r. This however, requires some signaling between devices that can be avoided if it is implemented in the receiving device 720.

Similar as described above in relation to FIG. 5, after the training, the trained precoder selection policy can be transferred to the transmitter and e.g. be implemented in a precoder block 711 of the transmitting device 710. The precoder block 711 being configured to select precoder according to the trained precoder selection policy and information on state s. The information on state s may now, since implementation is in the transmitting device 710, be based on reverse-link SRS.

Hence, the RL agent 740 may learn safely in a real-world environment without direct interaction with the environment, i.e. without selecting any precoder during RL. This ability, i.e. to learn without risking to interrupt or negatively interfere with the MIMO system during RL, may be a key for implementing the full benefits of RL and related state-of-art learning techniques.

The RL above and how it advantageously may be accomplished will now be further discussed.

One state-of-art learning method is the so called Deep Q-Network (DQN) algorithm that utilizes a deep network, denoted by $Q_\theta$ as a function approximator in the action value learning. See e.g. V. Mnih and et al, "*Human-level control through deep reinforcement learning,*" Nature, vol. 518, pp. 529-532, February 2015. The use of neural network in Q-learning has a benefit of generalization over the continuous state spaces so that the agent can perform well in testing environments similar to the environments that it has seen before during learning. This means that DQN can produce a good approximation over the entire state space by learning only with a limited subset of the state space. Therefore, the DQN algorithm can find approximate value functions effectively even for much larger problems with multi-dimensional and continuous states, while suffering less from the curse of dimensionality compared to the so called tabular method that can find the value function when the state and action spaces are small enough for a function approximator to be represented by a table.

Generalization is also an important problem in action space design. The generalization over action spaces means that similar actions in similar states tend to have similar action values, which further implies that nearby states can have similar optimal actions for a given state. Therefore, the action design may be formulated as a quantization problem in the optimal action space. Hence, the action set may be designed by quantizing the optimal action space under target environments. The action set with desired characteristics may be obtained by using Grassmannian codebooks thanks to the inherent relationship between the quantization problem and Grassmannian interpolation. See e.g. D. J. Love, R. W. Heath, and T. Strohmer, "*Grassmannian Beamforming for Multiple-Input Multiple-Output Wireless Systems,*" IEEE Transactions on Information Theory, vol. 49, pp. 2735-2748, October 2003. By assuming the distribution of an optimal beamforming vector in spatially-uncorrelated i.i.d. Rayleigh fading matrix channels H, an optimal precoder set may be achieved from a line packing problem. Grassmannian line packing is the problem of spacing N lines that pass through the origin in order to maximize the sine of the minimum angle between any two lines. The resulting N lines are uniformly distributed on the complex unit sphere and can be used to obtain the codebook with size N. Embodiments herein may utilize the Grassmannian codebook with e.g. size N=64, that may be denoted $\mathcal{A}_{GM64}$.

As already indicated above, in learning, an agent, e.g. the RL agent 540, may interact at discrete time steps t=1, 2, . . . , T−1 with the environment, e.g. of the MIMO system 500, to observe state $s_t$ and select action $a_t \in \mathcal{A}$. After each transition from $s_t$ to $s_{t+1}$, the agent obtains a, substantially immediate, reward $r_t$. Each experience transition at time step t may thus be represented by a tuple $$e_t = [s_t, a_t, r_t, s_{t+1}]$$  Equation 8

Figure 8:
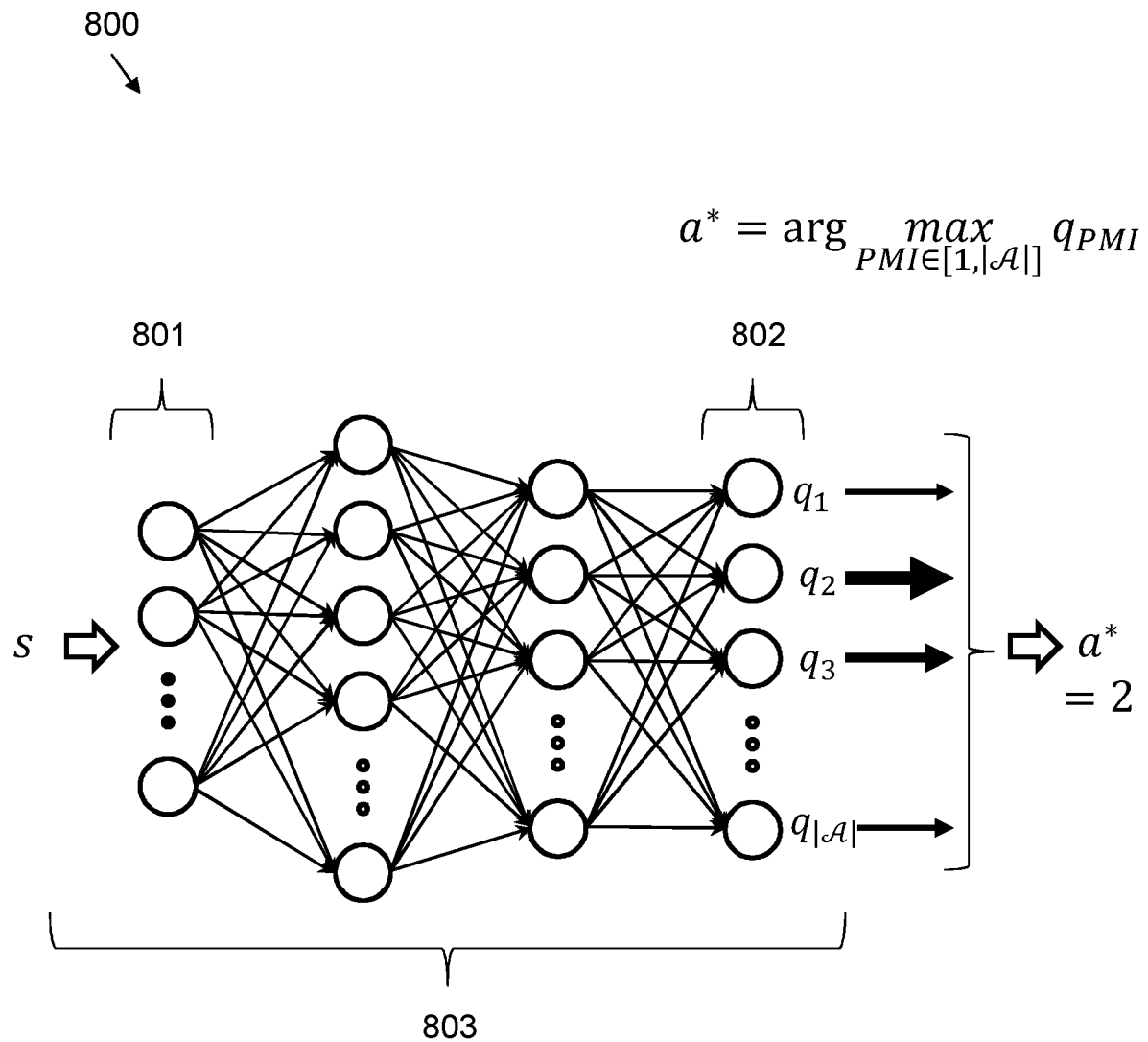
FIG. 8 schematically illustrates a neural network and how it can be used in some embodiments herein.

FIG. 8 schematically illustrates a neural network 800 in the form of a DQN with an input layer 801, an output layer 802 and function approximator part 803, i.e. a DQN action value approximator $Q_\theta$ with parameters θ, state s as input and a distinct output $q_a$, corresponding to an action value, for each action $a \in \mathcal{A}$, where $|\mathcal{A}|$ denotes the size of a pre-defined codebook. Here, each action a may correspond to a Precoding Matrix Indicator (PMI), such as used in LTE MIMO systems. Let $Q_\theta(s, a)$ denote a DQN approximation of the optimal action value indexed by the state-action pair (s, a). Then, the DQN algorithm may approximate the optimal value function $Q^*(s, a)$ as $Q_\theta(s, a)$ by measuring the difference between a current value estimate and a new estimate based on each new experience. For example: For each experience $e_t = [s_t, a_t, r_t, s_{t+1}]$, a current online value is given by $$Q_\theta(s_t, a_t)$$  Equation 9 while a newly estimated value, denoted by $Y_t^\theta$, may be obtained as $$Y_t^\theta = r_t + \max_{a \in \mathcal{A}} Q_\theta(s_{t+1}, a)$$  Equation 10

A loss function may be defined as a squared error between the two values as $$L(\theta) = \frac{1}{2} |Y_t^\theta - Q_\theta(s_t, a_t)|^2$$  Equation 11

Then, the value learning may be achieved by finding the optimal parameters θ through a loss minimization problem with respect to the loss function L(θ). A standard approach for loss function optimization is the so called gradient descent algorithm. In practice, the true gradient decent is typically approximated by a procedure called Stochastic Gradient Descent (SGD) to efficiently update the parameters. The parameter update may be made by adjusting the parameters in the opposite direction of the gradient according to $$\theta \leftarrow \theta - \eta (Q_\theta(s_t, a_t) - Y_t^\theta) \Delta_\theta Q_\theta(s, a),$$  Equation 12 where $\Delta_\theta Q_\theta(s, a)$ denotes the vector of partial derivatives with respect to the components of θ.

In summary, the learned action-value function $Q_\theta$ may directly approximate the optimal action-value function $Q^*$ and, accordingly, action prediction may be made from Equation 7. FIG. 8 also schematically illustrates action selection by using the learned DQN action value approximator, where PMI #2 has been chosen based on that it resulted in the highest action value. The arrows in the figure have been used to illustrate the size of the action values q, where thicker arrows indicate higher values than thinner arrows.

FIG. 9A is pseudo code regarding implementation of the "two-way" RL discussed above in relation to FIG. 5. With reference to what has been described and explained above, the pseudo code should be rather self-explanatory.

FIG. 9B is pseudo code regarding implementation of the "one-way" RL discussed above in relation to FIG. 7. With reference to what has been described and explained above, the pseudo code should be rather self-explanatory.

Figure 10:
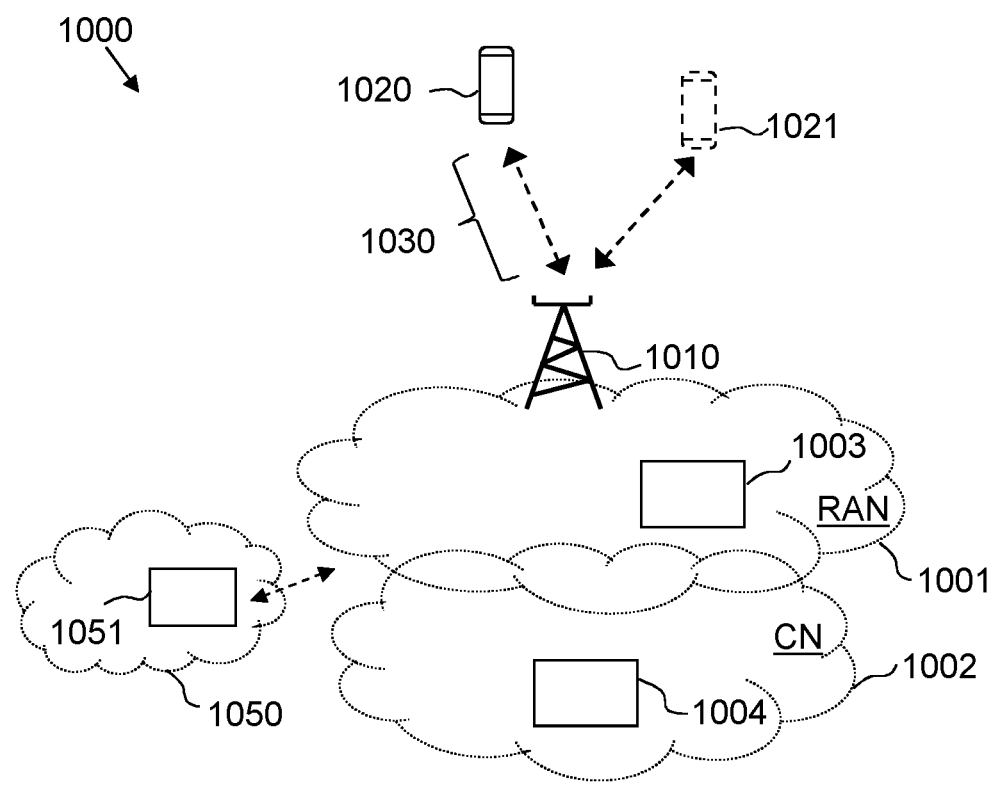
FIG. 10 is a block diagram schematically depicting an example of a wireless communication network in which embodiments herein may be implemented.

FIG. 10 is a block diagram schematically depicting an example of a wireless communication network 1000, e.g. a telecommunication network, to be used for further discussing embodiments herein and in which embodiments herein may be implemented. The wireless communication network 1000 may comprise a Radio Access Network (RAN) 1001 part and a core network (CN) 1002 part. The wireless communication network 1000 is typically a telecommunication network or system, such as a cellular communication network that supports at least one Radio Access Technology (RAT), e.g. LTE, or 4G, New Radio (NR) that also may be referred to as 5G. As realized it should also support multi-antenna transmitters, e.g. by supporting MIMO and/or MISO receivers and/or transmitters.

The wireless communication network 1000 comprises network nodes that are communicatively interconnected. The network nodes may be logical and/or physical and are located in one or more physical devices. The wireless communication network 1000, typically the RAN 1001, comprises a radio network node 1010, i.e. a network node being or comprising a radio transmitting network node, such as base station, and/or that are being or comprising a controlling node that controls one or more radio transmitting network nodes. Said radio network node may e.g. be communicatively connected, such as configured to communicate, over, or via, e.g. a so called X2-U communication interface or communication link with other radio network nodes (not shown) comprised in the RAN 1001.

Further, the wireless communication network 1000, or rather the CN 1002 typically comprises one or more core network nodes, e.g. a core network node 1004 that may be communicatively connected, such as configured to communicate, over, or via, a communication interface or communication link, such as the so called so called S1-U, with radio network nodes of the RAN 1001, e.g. with the radio network node 1010.

The wireless communication network 1000, or specifically one or more network nodes thereof, e.g. the network node 1010, is typically configured to serve and/or control and/or manage one or more wireless communication devices, such as a wireless device 1020 and a wireless device 1021, in radio coverage areas, i.e. an area where radio coverage is provided for communication with one or more communication devices. The wireless device 1020 may be alternatively be named a wireless communication device, UE etc. as explained elsewhere herein. Each radio coverage may be provided by and/or associated with a particular RAT. The radio coverage may be radio coverage of a radio beam, that simply may be named a beam. As should be recognized by the skilled person, a beam is a more dynamic and relatively narrow and directional radio coverage compared to a conventional cell, and may be accomplished by so called beamforming. A beam is typically for serving one or a few wireless devices at the same time, and may be specifically set up for serving this one or few wireless devices. The beam may be changed dynamically by beamforming to provide desirable coverage for the one or more wireless devices being served by the beam, e.g. by means of MIMO or MISO. There may be more than one beam provided by one and the same network node.

In the figure it is also indicated a communication channel 1030, that my correspond to the communication channel 530 or 730.

In the figure it is also shown a remote device 1051, e.g. remote network node, and a remote computer network 1050 that the remote device 1051 may be part of or connected to. The remote computer network 1050 may correspond to a so called computer cloud, or simply cloud, providing certain services. The remote device 1051 and/or remote network 1050 may e.g. be communicatively connected to the wireless communication network 1000, e.g. to one or more devices and/or nodes thereof, such as the CN 1002 and core network node 1003.

The wireless communication network 1000, e.g. the CN 1002 thereof, is further typically communicatively connected to, e.g. via the core network node 1003, and thereby e.g. provide access for said wireless communication device 1020, to an external network, e.g. the Internet. The external network may comprise and are connected to further network nodes, e.g. an external network node, such as corresponding to one or more data providing devices for providing data to wireless devices, e.g. in the form of a data flow. External here refers to external vs. the wireless communication network 1000. The data providing device(s) may e.g. correspond to server device(s) providing service(s), e.g. as part of a service providing computer cloud, to one or more other Internet connected devices, e.g. the wireless device 1020 that may be provided with access to the external network, such as the Internet, via the wireless communication network 1000, e.g. via the core network node 1003 as mentioned above. Such server device(s), or simply server(s), may alternatively be termed e.g. host computer(s), a server system etc.

Attention is drawn to that FIG. 1 is only schematic and for exemplifying purpose and that not everything shown in the figured may be required for all embodiments herein, as should be evident to the skilled person. Also, a communication system and wireless communication network that correspond(s) to the ones shown in the figure will typically comprise several further device, network nodes and details, as realized by the skilled person, but which are not shown herein for the sake of simplifying.

Figure 11A:
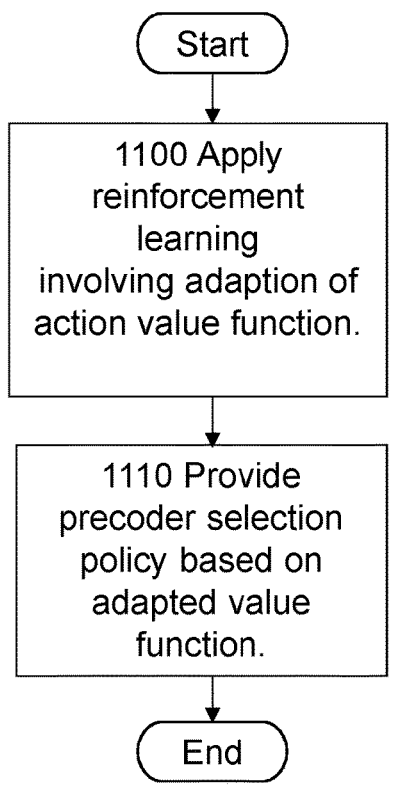
FIG. 11A is a flowchart schematically illustrating embodiments of a first method according to embodiments herein.

FIG. 11A is a flowchart schematically illustrating embodiments of a first method according to embodiments herein and based on the above detailed examples. The first method is for providing a precoder selection policy for a multi-antenna transmitter, e.g. any one of the multi-antenna transmitters 511, 711, arranged to transmit data over a communication channel, e.g. any one of the communication channels 530, 730, 1030, of a wireless communication network, e.g. the wireless communication network 1000. The first method may be performed by one or more first devices, i.e. first device(s), such as one or more of 510, 511, 720, 721, 1003, 1004, 1010, 1020, 1050, 1051. Details of particular embodiments discussed below, may determine which device(s) are suitable to carry out the first method and/or which action thereof, as will be recognized by the skilled person from what is disclosed herein.

The actions below may be taken in any suitable order and/or be carried out fully or partly overlapping in time when this is possible and suitable.

Action 1100

Said first device(s) applies machine learning in the form of reinforcement learning involving adaptation of an action value function, e.g. $Q_\theta(s_t, a_t)$ in Equation 9 above. The action value function being a function configured to compute an action value based on action information, e.g. corresponding to $a_t$, and state information, e.g. corresponding to $s_t$. Action information here being information indicative of a precoder of the multi-antenna transmitter, e.g. 511 or 711, and state information here being information indicative of a state relating to at least said communication channel, e.g. 530, 730 1030. The adaptation of the action value function being further based on reward information provided by a reward function, e.g. f(H, w) in Equation 6, where reward information here is information indicative of how successfully data is transmitted over the communication channel. f(H, w) is, as explained above, an example of a reward function based on BER performance over the communication channel.

It may be noted that said adaptation of the action value function may thus correspond to training of the action value function, e.g. $Q_\theta$, towards, i.e. to approach and/or approximate, an optimal value function, such as Q*(s, a) above. The optimal value function would enable an optimal action a to be taken, here corresponding to an optimal precoder to be selected, through the action a that would result in the highest action value for a given state, as discussed above in relation to Equation 7. In other words, the precoder selection policy may be based on selection of a precoder that for a given state information results in the highest action value according to the adapted action value function.

In the examples above, the adaptation of $Q_\theta$ towards Q* is based on defining a loss function L(θ) using the reward function f(H,w) and training through loss minimization, see Equations 10-12. As realized by the skilled person, this is only an example, and many other reward functions and/or training algorithms can be defined. For example, the reinforcement learning and adaption of the action value function may comprise training of a neural network, e.g. the neural network 800 as discussed above in relation to FIG. 8. In some embodiments, the reinforcement learning is based on a DQN reinforcement learning algorithm and said neural network correspond to a DQN. An input layer, e.g. 801, of the neural network may be configured to obtain said state information and an output layer, e.g. 802, of the neural network may be configured to provide action values, one per action information from a predefined set of possible action information.

In some embodiments, the action information relates to an identifier identifying a precoder of a predefined set of precoders. In these embodiments and in case of the neural network, the neural network being configured to provide the action values, one per action information from a predefined set of possible action information may correspond to provide the actions values, one per identifier identifying a precoder from a predefined set of possible precoders.

As mentioned above, the state here relates to at least the communication channel, however, the state may further relate to also the multi-antenna transmitter. For example, the state information may be based on environment information regarding the communication channel and preferably also regarding the multi-antenna transmitter. The environmental information may correspond measures(s) of parameters that affect the transmission of data over the communication channel, e.g. the environmental information may comprise CSI, data on load conditions at the multi-antenna transmitter, information regarding que status of a scheduler involved in scheduling data transmitted by the multi-antenna transmitter, a traffic model being applied when transmitting data using the multi-antenna transmitter, etc.

In some embodiments, covering the detailed examples discussed above, said state information is based on a reference signal transmitted over said communication channel, e.g. any one of the communication channels 530, 730, 1030, or over a reciprocal communication channel to said communication channel. As used herein, the reciprocal communication channel refers to another communication channel but that behaves so similar that there is no, or substantial no, difference between transmissions over the communication channel and the reciprocal communication channel. Said reference signal may be transmitted by a wireless communication device, e.g. the wireless communication device 1020, to the wireless communication network, e.g. the wireless communication network 1000, to enable the wireless communication network to, based on the received reference signal, obtain information about state of the communication channel. Hence, as already indicated in the foregoing, the reference signal may correspond to a DMRS or a SRS, and/or said information about status of the communication channel may correspond to CSI. As also indicated in the foregoing, DMRS is typically used in the forward link and SRS in the reverse-link. The links here referring to communication over the communication channel, and the directions forward and reverse being in relation to the transmission direction, i.e. from transmitter to receiver.

Further, in some embodiments, the reward function and reward information are based on bit error rate associated with transmission of data over said communication channel and provided so that lower bit error rate is rewarded more than higher bit error rate. This is thus similar to the case according to the detailed example in the foregoing, where BSR was formed from BER and the reward function based on that, see Equations 3-6.

Action 1110

Said first device(s) provides said precoder selection policy based on said adapted action value function resulting from the reinforcement learning. In other words, after the training based on reinforcement learning as in Action 100, the adapted, i.e. trained, action value function, such as a trained version of $Q_\theta$, is provided and can, i.e. post training, be used for selecting precoders for the multi-antenna transmitter. This is separately discussed below in relation to FIG. 13. For example, in case of training of a neural network, e.g. the neural network 800, the provided precoder selection policy is thus based on a trained version of the neural network.

Figure 11B:
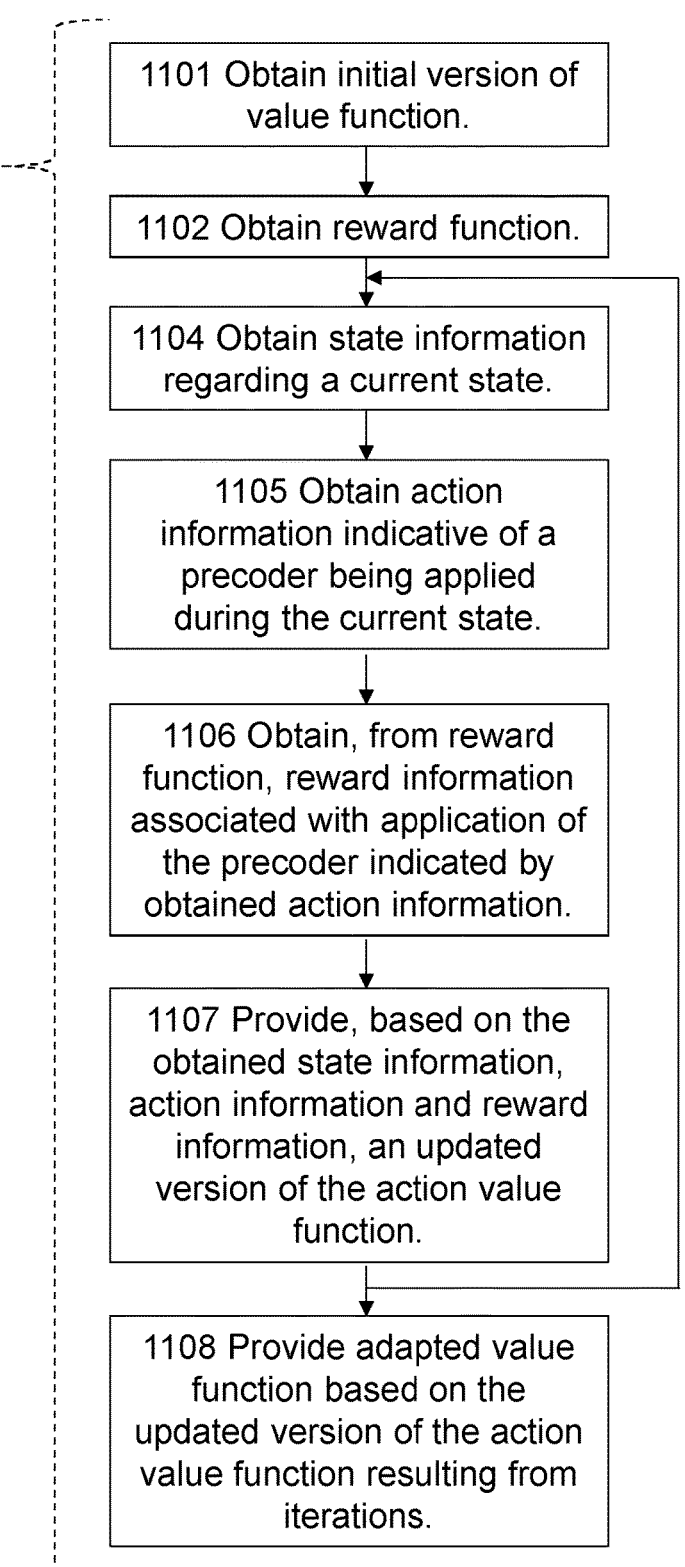
FIG. 11B is a flowchart schematically illustrating embodiments of actions according to some embodiments relating to the first method.

FIG. 11B is a flowchart schematically illustrating embodiments of actions according to some embodiments relating to the first method, and based on the above detailed examples. More particularly, these embodiments relate how Action 1100 in FIG. 11A may be carried out in some further detail, or in other words relate to what said application of machine learning in the form of reinforcement learning may comprise.

Same as for FIG. 11A, the actions below may be taken in any suitable order and/or be carried out fully or partly overlapping in time when this is possible and suitable.

Action 1101

Said first device(s) obtains an initial version of the action value function.

Action 1102

Said first device(s) obtains the reward function.

Action 1103

Said first device(s) performs iterations of Actions 1104-1107 at different points in time and thereby at different combinations of state information, action information and reward information. For how long, at which points in time and/or how many iterations suitably to be performed, may vary from case to case and be left for the skilled person to find out and/or it may be predetermined. In principle, each iteration will enable a better trained action value function and potentially better result.

Action 1104

Said first device(s) obtains state information regarding a current state. As explained above, the current state should be a current state of the communication channel and/or the multi-antenna transmitter.

Action 1105

Said first device(s) obtains action information indicative of a precoder being applied by the multi-antenna transmitter during said current state. The precoder should here of course be one applied by the multi-antenna transmitter regarding the communication channel.

Action 1106

Said first device(s) obtains, from the reward function, reward information associated with, e.g. at least partly resulting from, application of the precoder indicated by the obtained action information.

Action 1107

Based on the obtained reward information, the obtained state information and the obtained action, i.e. as obtained in Actions 1104-1106, said first device(s) provides an updated version of the initial action value function, or of a version of the action value function updated in a previous iteration of Actions 1104-1107.

Action 1108

After said iterations of Actions 1104-1107, e.g. when the training by reinforcement learning is considered sufficient, said first device(s) provides the thereby adapted, i.e. trained, action value function based on the updated version the action value function resulting from said performed iterations, i.e. typically the updated version according to the last iteration.

In some embodiments, e.g. covering the pseudo code example shown in FIG. 9A, obtaining the action information in Action 1105 comprises to choose the action information according to one or more of the following:
 a) Randomly from a predefined set of action information.
 b) Randomly from a subset to said predefined set, which subset comprises action information that results in greater action values than the rest of the action information of the predefined set.
 c) From action information that results in the greatest of action values among the action information of said predefined set.

In these embodiments, said action values should thus be such that result from application of the initial action value function, or action value function updated in a previous iteration.

Further, in these embodiments, it may be preferred to use the chosen action information in each iteration of Action 1105 for selecting the precoder applied, i.e. the precoder used in the iteration and part of the training. The action information here thus preferably relates to an identifier, as mentioned above, identifying a precoder of a predefined set of precoders. This is in line with the "two-way" interaction discussed above in connection with the pseudo code of FIG. 9A. Hence, selecting randomly as in a), e.g. from the predefined set of precoders, means a high degree of exploration. Selecting randomly as in b) means some mix of exploration and exploitation using precoders that according to the initial action value function or an updated version of the action value function from a previous iteration, results in the greatest, e.g. highest action values. Selecting as in c) on the other hand means only exploitation, which is typically not optimal from a learning and training perspective but may e.g. be combined with a). Typically b), or in combination with a) may be preferred, for example, to a certain, such as predefined, probability, what is described under b) is used, else a).

However, as discussed above in relation to FIG. 9B, it may not always be desirable with a "two-way" interaction during training but instead a "one-way" interaction. That is, during the training and in the iterations, the action value function is not used for choosing action information, such as precoders, but instead the precoders may be chosen in some conventional way, and this is observed and used in the training, i.e. for updating of the action value function as described herein. This may be preferred in case of an existing "up and running" multi-antenna transmitter that an operator employ at some site and is involved in serving real users. In such case it may not be desirable to let a not yet sufficiently trained function be involved in selecting precoders.

In other words, in some embodiments, e.g. covering the pseudo code example shown in FIG. 9B, the obtained action information in Action 1105 relates to, such as corresponds to or is determined by, precoders selected while operating the multi-antenna transmitter in the wireless communication network, e.g. the wireless communication network 1000, under application of another, e.g. conventional and/or existing, predefined precoder selection policy. Hence, in this case, the action value function should or need not be used in the iterations for choosing the action information, and there is instead a "one way" kind of interaction during training.

In such "one way" interaction during training, the action function may thus be updated based on precoders selected by a prior art and/or already "in use" selection method or policy, such as of an existing, "real world" live operating multi-antenna transmitter, which in turn may be part of an existing base station serving wireless communication devices. This multi-antenna transmitter may perform precoder selection, e.g. apply an already existing precoder selection policy and/or according to some prior art selection method, such as any of the methods indicated in the Background, or based on a previously trained function or model for precoder selection. An advantage with the one-way training is thus that there is no need to expose any existing, live and operative wireless communication network and users being served by such, for precoders selected based on the updated version of the value function, until there is a sufficiently trained value function that the precoder selection policy can be based on and precoders be selected according to. It has been found that prior art systems typically perform both optimal and suboptimal selections and thereby can be considered to cover something that will be similar to a mix of both exploration and exploration aspects in the way precoders are selected, and therefore can, and even beneficially may, be used for this kind of training.

Of course said "one-way" and "two-way" approaches may be combined. For example, first is a precoder selection policy trained "one-way" and then is the corresponding value function used "two way" during continued training while at the same time it is used to select precoders. For example, choosing action information according to c) above may be combined with the "one-way" approach, resulting in a variant of the "two-way" approach but without having to expose the system to random selections.

In some embodiments, for each or some of said iterations of Actions 1104-1107, a combination of state, action and reward information from each such iteration may be saved to be used for future updates to the action value function. In these embodiments, said update of the action value function in Action 1107, may be performed by choosing one or more of said saved combinations of state, action and reward information, e.g. randomly.

This may be described as experience replay, where experiences of state, action and reward information may be saved in memory and later be used, e.g. by randomly choosing one such experience, which may be referred to as non-batch based learning, or choosing multiple such experiences, which may be referred to as batch-based learning, to update the action value function. Both may result in improved learning behaviors.

Figure 12:
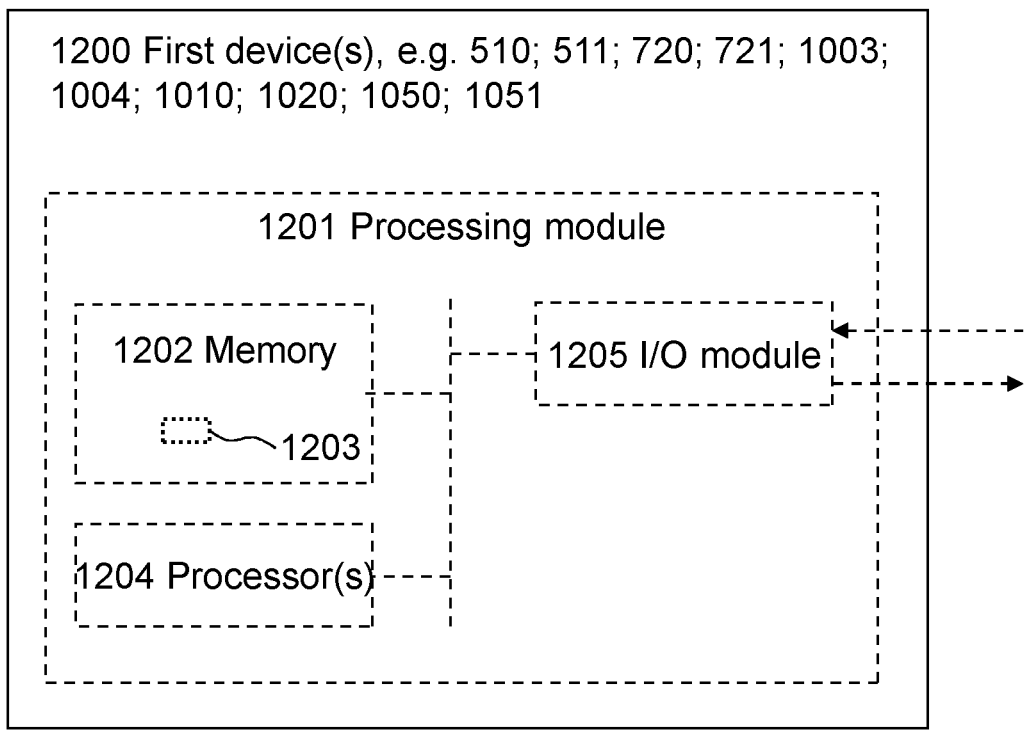
FIG. 12 is a schematic block diagram for illustrating embodiments of how one or more first devices may be configured to perform the first method.

FIG. 12 is a schematic block diagram for illustrating embodiments of how one or more first devices 1200, e.g. said one or more first devices discussed above in connection with FIGS. 11A-B may be configured to perform the first method and actions discussed above in connection with FIGS. 11A-B.

Hence, the device(s) 1200 relates to, e.g. is for, providing a precoder selection policy for a multi-antenna transmitter, e.g. the multi-antenna transmitter 511 or 711, arranged to transmit data over a communication channel, e.g. the communication channel 530, 730 or 1030, of a wireless communication network, e.g. the wireless communication network 1000.

The device(s) 1200 may comprise a processing module 1201, such as a means, one or more hardware modules, including e.g. one or more processors, and/or one or more software modules for performing said method and/or actions.

The device(s) 1200 may further comprise memory 1202 that may comprise, such as contain or store, a computer program 1203. The computer program 1203 comprises 'instructions' or 'code' directly or indirectly executable by the device(s) 1200 to perform said method and/or actions. The memory 1202 may comprise one or more memory units and may further be arranged to store data, such as configurations and/or applications involved in or for performing functions and actions of embodiments herein.

Moreover, the device(s) 1200 may comprise a processor(s) 1204, i.e. one or more processors, as exemplifying hardware module(s) and may comprise or correspond to one or more processing circuits. In some embodiments, the processing module(s) 1201 may comprise, e.g. 'be embodied in the form of' or 'realized by' processor(s) 1204. In these embodiments, the memory 1202 may comprise the computer program 1203 executable by the processor(s) 1204, whereby the device(s) 1200 is operative, or configured, to perform said method and/or actions thereof.

Typically the device(s) 1200, e.g. the processing module(s) 1201, comprises Input/Output (I/O) module(s) 1205, such as circuitry, configured to be involved in, e.g. by performing, any communication to and/or from other units and/or devices, such as sending and/or receiving information to and/or from other devices, e.g. receiving from the radio network node 1010 and sending towards wireless device 1020. The I/O module(s) 1205 may be exemplified by obtaining, e.g. receiving, module(s) and/or providing, e.g. sending, module(s), when applicable.

Further, in some embodiments, the device(s) 1200, e.g. the processing module(s) 1201, comprises one or more of applying modules(s), obtaining module(s), initiating module(s), providing module(s), selecting module(s), performing module(s), as exemplifying hardware and/or software module(s) for carrying out actions of embodiments herein. These modules may be fully or partly implemented by the processor(s) 1204.

The device(s) 1200, and/or the processing module(s) 1201, and/or the processor(s) 1204, and/or the I/O module(s) 1205, and/or the applying module(s) may thus be operative, or configured, to apply said machine learning in the form of reinforcement learning.

Further, the device(s) 1200, and/or the processing module(s) 1201, and/or the processor(s) 1204, and/or the I/O module(s) 1205, and/or the providing module(s) may be operative, or configured, to provide said precoder selection policy based on said adapted action value function resulting from the reinforcement learning.

Moreover, the device(s) 1200, and/or the processing module(s) 1201, and/or the processor(s) 1204, and/or the I/O module(s) 1205, and/or the obtaining module(s) may be operative, or configured, to obtain said initial version of the action value function and the reward function.

The device(s) 1200, and/or the processing module(s) 1201, and/or the processor(s) 1204, and/or the I/O module(s) 1205, and/or the performing module(s), may be operative, or configured, to perform said iterations at different points in time and thereby at different combinations of state information and action information, that is, to obtain said state information regarding the current state, obtain the action information indicative of the precoder being applied by the multi-antenna transmitter during said current state, obtain, from the reward function, said reward associated with application of the precoder indicated by the obtained action information, and provide, based on the obtained reward information, the obtained state information and the obtained action information, said updated version of the initial action value function or of said version of the action value function updated in a previous iteration.

Further, the device(s) 1200, and/or the processing module(s) 1201, and/or the processor(s) 1204, and/or the I/O module(s) 1205, and/or the providing module(s) may be operative, or configured, to provide the adapted action value function based on the updated version of the action value function resulting from said performed iterations.

Figure 13:
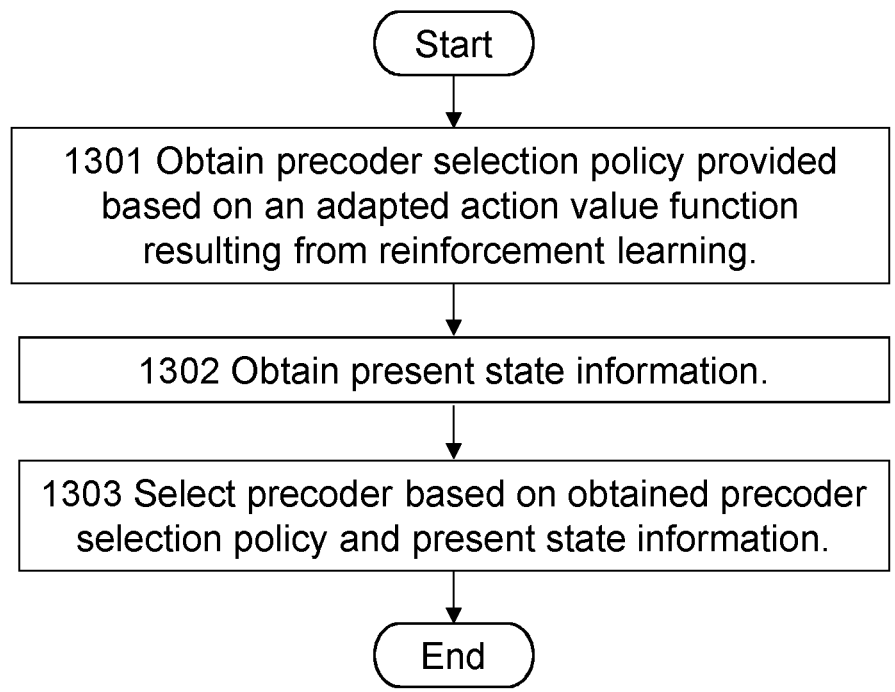
FIG. 13 is a flowchart schematically illustrating embodiments of a second method according to embodiments herein.

FIG. 13 is a flowchart schematically illustrating embodiments of a second method according to embodiments herein. Basically the second method relates to use of the precoder selection policy provided by the first method as descried above in relation to FIG. 11A-B, i.e. of the action value function after it has been trained by means of reinforcement learning. The second method is for selecting precoder of a multi-antenna transmitter, e.g. any one of the multi-antenna transmitters 511, 711. The multi-antenna transmitter thus being configured to transmit data over a communication channel, e.g. one or more of the communication channels 530, 730, 1030, of a wireless communication network, e.g. the wireless communication network 1000. The second method may be performed by one or more second devices, i.e. second device(s), such as one or more of 510, 511, 710, 711, 1003, 1004, 1010, 1050, 1051. Details of particular embodiments discussed below, may determine which device(s) are suitable to carry out the second method and/or which action thereof, as will be recognized by the skilled person from what is disclosed herein.

The actions below may be taken in any suitable order and/or be carried out fully or partly overlapping in time when this is possible and suitable.

Action 1301

Said second device(s) obtains a precoder selection policy provided according to the first method. That is, as explained above, a precoder selection policy based on an adapted, i.e. trained, action value function, where the training has been accomplished through reinforcement learning.

Action 1302

Said second device(s) obtains state information regarding a present state. As realized, the state as such should be defined as during the training, i.e. here as when the first method was performed.

Action 1303

Said second device(s) selects the precoder based on the obtained precoder selection policy and the obtained present state information.

As explained for the first method above, the precoder selection policy is based on said adapted action value function, i.e. the trained action value function, resulting from the reinforcement learning. In other words, selecting the precoder in the present action may correspond to selecting a precoder associated with the action information that results in the greatest action value from the adapted action value function when the state information regarding the present state is used with, i.e. used as input to, the adapted action value function.

Figure 14:
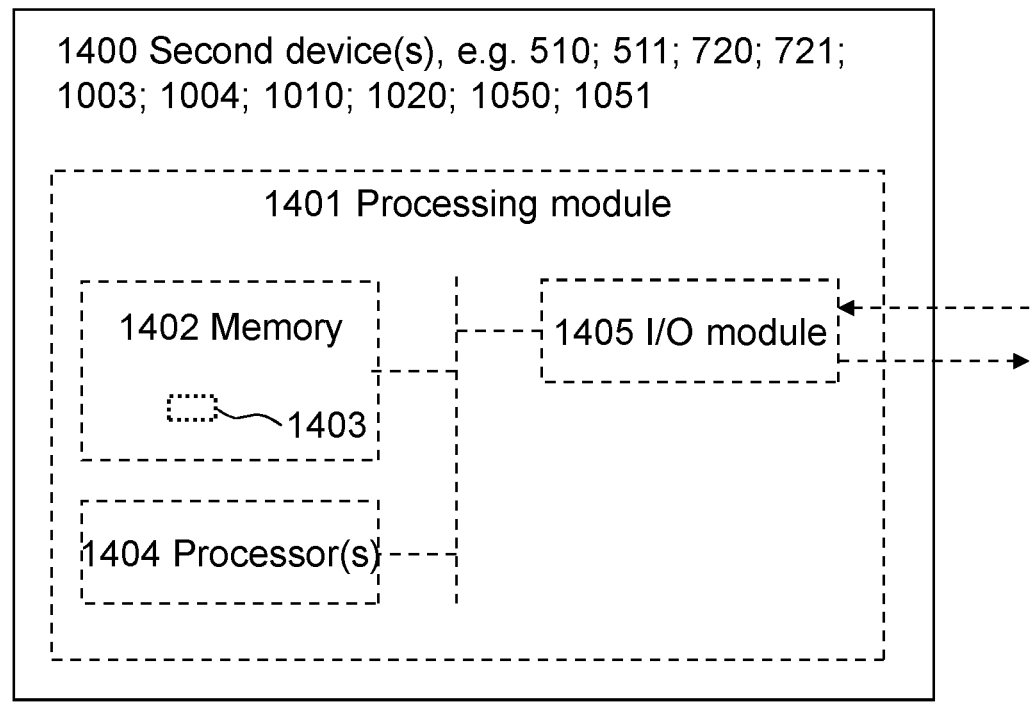
FIG. 14 is a schematic block diagram for illustrating embodiments of how one or more second devices may be configured to perform the second method.

FIG. 14 is a schematic block diagram for illustrating embodiments of how one or more second devices 1400, e.g. said one or more second devices discussed above in connection with FIG. 13 may be configured to perform the second method and actions discussed above in connection with FIG. 13.

Hence, the device(s) 1400 relates to, e.g. is for, selecting precoder of a multi-antenna transmitter, e.g. the multi-antenna transmitter 511 or 711, being configured to transmit data over a communication channel, e.g. the communication channel 530, 730 or 1030, of a wireless communication network, e.g. the wireless communication network 1000.

The device(s) 1400 may comprise a processing module 1401, such as a means, one or more hardware modules, including e.g. one or more processors, and/or one or more software modules for performing said method and/or actions.

The device(s) 1400 may further comprise memory 1402 that may comprise, such as contain or store, a computer program 1403. The computer program 1403 comprises 'instructions' or 'code' directly or indirectly executable by the device(s) 1400 to perform said method and/or actions. The memory 1402 may comprise one or more memory units and may further be arranged to store data, such as configurations and/or applications involved in or for performing functions and actions of embodiments herein.

Moreover, the device(s) 1400 may comprise a processor(s) 1404, i.e. one or more processors, as exemplifying hardware module(s) and may comprise or correspond to one or more processing circuits. In some embodiments, the processing module(s) 1401 may comprise, e.g. 'be embodied in the form of' or 'realized by' processor(s) 1404. In these embodiments, the memory 1402 may comprise the computer program 1403 executable by the processor(s) 1404, whereby the device(s) 1400 is operative, or configured, to perform said method and/or actions thereof.

Typically the device(s) 1400, e.g. the processing module(s) 1401, comprises Input/Output (I/O) module(s) 1405, such as circuitry, configured to be involved in, e.g. by performing, any communication to and/or from other units and/or devices, such as sending and/or receiving information to and/or from other devices, e.g. receiving from the radio network node 1010 and sending towards wireless device 1020. The I/O module(s) 1405 may be exemplified by obtaining, e.g. receiving, module(s) and/or providing, e.g. sending, module(s), when applicable.

Further, in some embodiments, the device(s) 1400, e.g. the processing module(s) 1401, comprises one or more of obtaining module(s) and selecting module(s) as exemplifying hardware and/or software module(s) for carrying out actions of embodiments herein. These modules may be fully or partly implemented by the processor(s) 1404.

The device(s) 1400, and/or the processing module(s) 1401, and/or the processor(s) 1404, and/or the I/O module(s) 1405, and/or the obtaining module(s) may thus be operative, or configured, to obtain the precoder selection policy provided according to the first method, and obtain said state information regarding the present state.

Further, the device(s) 1400, and/or the processing module(s) 1201, and/or the processor(s) 1204, and/or the I/O module(s) 1205, and/or the selecting module(s) may be operative, or configured, to select the precoder based on the obtained precoder selection policy and the obtained present state information.

Figure 15:
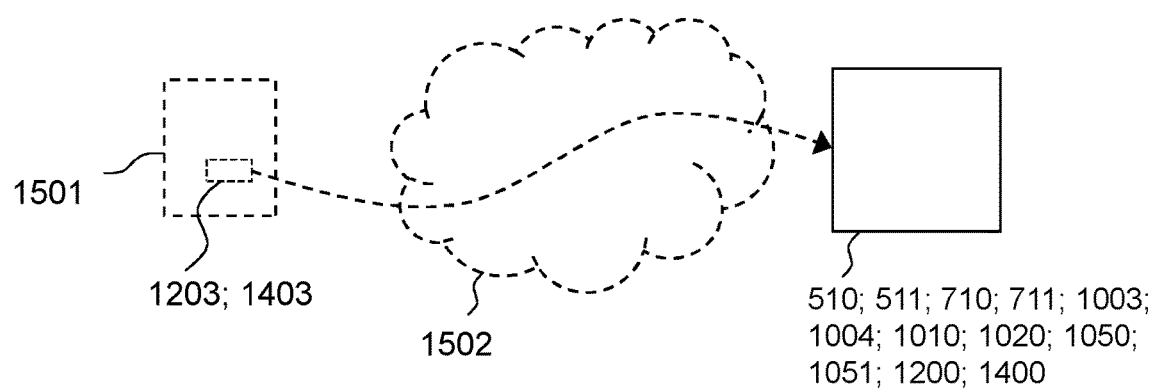
FIG. 15 is a schematic drawing illustrating some embodiments relating to computer programs and carriers thereof.

FIG. 15 is a schematic drawing illustrating some embodiments relating to computer program(s) and carriers thereof to cause one or more of said device(s) 1200, 1400 discussed above to perform said first method, second method and/or related actions. The computer program(s) may be the computer program 1203 and/or 1403 and comprises instructions that when executed by the processor(s) 1204 and/or 1404, and/or the processing module(s) 1201 and/or 1401, cause the device(s) 1200 and/or 1400 to perform as described above. In some embodiments there is provided carrier(s), or more specifically data carrier(s), e.g. a computer program product(s), comprising the computer program(s). The carrier(s) may be one of an electronic signal, an optical signal, a radio signal, and a computer readable storage medium or media, e.g. a computer readable storage medium 1501 as schematically illustrated in the figure. The computer program(s) 1203 and/or 1403 may thus be stored on the computer readable storage medium 1501. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 1501 may be used for storing data accessible over a computer network 1502, e.g. the Internet or a Local Area Network (LAN). The computer program(s) 1203 and/or 1403 may furthermore be provided as pure computer program(s) or comprised in a file or files. The file or files may be stored on the computer readable storage medium 1501 and e.g. available through download e.g. over the computer network 1502 as indicated in the figure, e.g. via a server. The server may e.g. be a web or File Transfer Protocol (FTP) server. The file or files may e.g. be executable files for direct or indirect download to and execution on said device(s) 1200 and/or 1400 to make it/them perform as described above, e.g. by execution by the processor(s) 1204 and/or 1404. The file or files may also or alternatively be for intermediate download and compilation involving the same or another processor(s) to make them executable before further download and execution causing said device(s) 1200 and/or 1400 to perform as described above.

Note that any processing module(s) and circuit(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in the wireless communication network or at least in a relevant part or area thereof.

The term "network node" or simply "node" as used herein may as such refer to any type of node that may communicate with another node in and be comprised in a communication network, e.g. IP network or wireless communication network. Further, such node may be or be comprised in a radio network node (described below) or any network node, which e.g. may communicate with a radio network node. Examples of such network nodes include any radio network node, a core network node, Operations & Maintenance (O&M), Operations Support Systems (OSS), Self Organizing Network (SON) node, etc.

The term "radio network node" as may be used herein may as such refer to any type of network node for serving a wireless communication device, e.g. a so called User Equipment or UE, and/or that are connected to other network node(s) or network element(s) or any radio node from which a wireless communication device receives signals from. Examples of radio network nodes are Node B, Base Station (BS), Multi-Standard Radio (MSR) node such as MSR BS, eNB, eNodeB, gNB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless communication device", "user equipment" and "UE", as may be used herein, may as such refer to any type of wireless device arranged to communicate with a radio network node in a wireless, cellular and/or mobile communication system, and may thus be referred to as a wireless communication device. Examples include: target devices, device to device UE, device for Machine Type of Communication (MTC), machine type UE or UE capable of machine to machine (M2M) communication, Personal Digital Assistant (PDA), Tablet, mobile, terminals, smart phone, Laptop Embedded Equipment (LEE), Laptop Mounted Equipment (LME), Universal Serial Bus (USB) dongles etc.

While some terms are used frequently herein for convenience, or in the context of examples involving other a certain, e.g. 3GPP or other standard related, nomenclature, it must be appreciated that such term as such is non-limiting.

Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first device or node, second device or node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. A method, performed by one or more first devices, for providing a precoder selection policy for a multi-antenna transmitter to transmit data over a communication channel of a wireless communication network, the method comprising:

applying machine learning in a form of reinforcement learning involving adaptation of an action value function configured to compute an action value based on action information and state information, where action information is information indicative of a precoder of the multi-antenna transmitter and state information is information indicative of a state relating to at least the communication channel, the adaptation of the action value function being further based on reward information provided by a reward function, where reward information is information indicative of how successfully data is transmitted over the communication channel, the action information relating to an identifier identifying a precoder of a predefined set of precoders; and after the training based on reinforcement learning, providing the adapted action value function and using post training for selecting the precoder for the multi-antenna transmitter.

2. The method as claimed in claim 1, wherein the precoder selection policy is based on selection of a precoder that for a given state information results in a highest action value according to the adapted action value function.

3. The method as claimed in claim 1, wherein the reinforcement learning and adaption of the action value function comprises training of a neural network and the provided precoder selection policy is based on a trained version of the neural network.

4. The method as claimed in claim 3, wherein the reinforcement learning is based on a Deep Q Network (DQN) reinforcement learning algorithm and the neural network corresponds to a DQN.

5. The method as claimed in claim 3, wherein an input layer of the neural network is to obtain the state information and an output layer of the neural network is to provide action values, one per action information from a predefined set of possible action information.

6. The method as claimed in claim 1, wherein the applying of machine learning in the form of reinforcement learning comprises:

obtaining an initial version of the action value function;
obtaining the reward function;
performing iterations of the following at different points in time and thereby at different combinations of state information, action information and reward information:
  obtaining state information regarding a current state;
  obtaining action information indicative of a precoder being applied by the multi-antenna transmitter during the current state;
  obtaining, from the reward function, reward associated with application of the precoder indicated by the obtained action information; and
  providing, based on the obtained reward information, the obtained state information and the obtained action information, an updated version of the initial action value function or of a version of the action value function updated in a previous iteration; and
providing the adapted action value function based on the updated version of the action value function resulting from the performed iterations.

7. The method as claimed in claim 6, wherein the action information relates to an identifier identifying a precoder of a predefined set of precoders.

8. The method as claimed in claim 6, wherein the obtained action information relates to precoders selected while operating the multi-antenna transmitter in the wireless communication network under application of another predefined precoder selection policy.

9. The method as claimed in claim 6, wherein the obtaining of action information comprises choosing the action information according to one or more of the following:
  randomly from a predefined set of action information;
  randomly from a subset to the predefined set, which subset comprises action information that results in greater action values than a rest of the action information of the predefined set; and
  from action information that results in a greatest of action values among the action information of the predefined set.

10. The method as claimed in claim 1, wherein the state information is based on a reference signal transmitted over the communication channel or over a reciprocal communication channel to the communication channel.

11. The method as claimed in claim 10, wherein the reference signal corresponds to a Demodulation Reference Signal (DMRS), a Sounding Reference Signal (SRS), or both the DMRS and the SRS; or the information about status of the communication channel corresponds to Channel State Information (CSI); or the information about status of the communication channel which corresponds to the CSI and the reference signal which corresponds to the DMRS or SRS or both the DMRS and the SRS.

12. The method as claimed in claim 1, wherein the reward function and reward information are based on bit error rate associated with transmission of data over the communication channel and provided so that lower bit error rate is rewarded more than higher bit error rate.

13. A method, performed by one or more second devices, for selecting a precoder of a multi-antenna transmitter, the multi-antenna transmitter to transmit data over a communication channel of a wireless communication network, the method comprising:

obtaining a precoder selection policy, in which the precoder selection policy was performed by one or more first devices by:
  applying machine learning in a form of reinforcement learning involving adaptation of an action value function configured to compute an action value based on action information and state information, where action information is information indicative of a precoder of the multi-antenna transmitter and state information is information indicative of a state relating to at least the communication channel, the adaptation of the action value function being further based on reward information provided by a reward function, where reward information is information indicative of how successfully data is transmitted over the communication channel, the action information relating to an identifier identifying a precoder of a predefined set of precoders; and
  after the training based on reinforcement learning, providing the adapted action value function and using post training for selecting the precoder for the multi-antenna transmitter;
obtaining state information regarding a present state; and
selecting the precoder based on the obtained precoder selection policy and the obtained present state information.

14. One or more first devices for providing a precoder selection policy for a multi-antenna transmitter to transmit data over a communication channel of a wireless communication network, the one or more first devices comprising:
one or more processors; and
one or more memory containing instructions which, when executed by the one or more processors, cause the one or more first devices to:
  apply machine learning in a form of reinforcement learning involving adaptation of an action value function configured to compute an action value based on action information and state information, where action information is information indicative of a precoder of the multi-antenna transmitter and state information is information indicative of a state relating to at least the communication channel, the adaptation of the action value function being further based on reward information provided by a reward function, where reward information is information indicative of how successfully data is transmitted over the communication channel, the action information relating to an identifier identifying a precoder of a predefined set of precoders, and after the training based on reinforcement learning, provide the adapted action value function and use post training for selecting the precoder for the multi-antenna transmitter.

15. The one or more first devices as claimed in claim 14, wherein the precoder selection policy is based on selection of a precoder that for a given state information results in a highest action value according to the adapted action value function.

16. The one or more first devices as claimed in claim 14, wherein the reinforcement learning and adaption of the action value function comprises training of a neural network and the provided precoder selection policy is based on a trained version of the neural network.

17. The one or more first devices as claimed in claim 16, wherein the reinforcement learning is based on a Deep Q Network (DQN) reinforcement learning algorithm and the neural network corresponds to a DQN.

18. The one or more first devices as claimed in claim 16, wherein an input layer of the neural network is to obtain the state information and an output layer of the neural network is to provide action values, one per action information from a predefined set of possible action information.

19. The one or more first devices as claimed in claim 14, wherein the reward function and reward information are based on bit error rate associated with transmission of data over the communication channel and provided so that lower bit error rate is rewarded more than higher bit error rate.

20. One or more second devices for selecting a precoder of a multi-antenna transmitter, the multi-antenna transmitter to transmit data over a communication channel of a wireless communication network, the one or more second devices comprising:

one or more processors; and one or more memory containing instructions which, when executed by the one or more processors, cause the one or more second devices to:

obtain a precoder selection policy, in which the precoder selection policy was performed by one or more first devices by:

application of machine learning in a form of reinforcement learning involving adaptation of an action value function configured to compute an action value based on action information and state information, where action information is information indicative of a precoder of the multi-antenna transmitter and state information is information indicative of a state relating to at least the communication channel, the adaptation of the action value function being further based on reward information provided by a reward function, where reward information is information indicative of how successfully data is transmitted over the communication channel, the action information relating to an identifier identifying a precoder of a predefined set of precoders; and providing the precoder selection policy based on said adapted action value function resulting from the reinforcement learning after the training based on reinforcement learning, providing the adapted action value function and use post training for selecting the precoder for the multi-antenna transmitter;

obtain state information regarding a present state; and select the precoder based on the obtained precoder selection policy and the obtained present state information.

\* \* \* \* \*